United States Patent
Phuyal et al.

(10) Patent No.: US 12,250,704 B2
(45) Date of Patent: Mar. 11, 2025

(54) PRECONFIGURED UPLINK RESOURCE TECHNIQUES IN WIRELESS COMMUNICATIONS

(71) Applicant: QUALCOMM Incorporated, San Diego, CA (US)

(72) Inventors: Umesh Phuyal, San Diego, CA (US); Ayan Sengupta, San Diego, CA (US); Le Liu, Fremont, CA (US); Alberto Rico Alvarino, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/749,790

(22) Filed: Jan. 22, 2020

(65) Prior Publication Data
US 2020/0245334 A1 Jul. 30, 2020

Related U.S. Application Data

(60) Provisional application No. 62/797,168, filed on Jan. 25, 2019.

(51) Int. Cl.
*H04W 72/1268* (2023.01)
*H04L 1/1812* (2023.01)
(Continued)

(52) U.S. Cl.
CPC ........... *H04W 72/53* (2023.01); *H04L 1/1819* (2013.01); *H04L 5/0055* (2013.01); *H04W 24/08* (2013.01);
(Continued)

(58) Field of Classification Search
CPC ... H04L 1/1896; H04L 5/0055; H04L 5/0058; H04L 72/0413; H04L 74/004;
(Continued)

(56) References Cited

U.S. PATENT DOCUMENTS

| | | | | |
|---|---|---|---|---|
| 2011/0092219 A1* | 4/2011 | Damnjanovic | ..... | H04W 52/281 455/450 |
| 2012/0008600 A1* | 1/2012 | Marinier | ........... | H04W 56/0045 370/336 |

(Continued)

FOREIGN PATENT DOCUMENTS

CN 103283171 A 9/2013

OTHER PUBLICATIONS

International Search Report and Written Opinion—PCT/US2020/014802—ISA/EPO—May 14, 2020.
(Continued)

*Primary Examiner* — Marcus Smith
*Assistant Examiner* — Jason A Harley
(74) *Attorney, Agent, or Firm* — Holland & Hart LLP

(57) ABSTRACT

Methods, systems, and devices for wireless communications are described. that support preconfigured uplink resources (PUR) in wireless communications. A base station may communicate that support for PUR is available, and may allocate PUR resources to a user equipment (UE) based on requests from the UE. The UE may receive an indication that the base station supports PUR, such as via a system information block (SIB), determine to request PUR, and transmit a PUR request message to the base station. A PUR response from the base station may indicate a PUR allocation for the UE that may be used for uplink transmissions. Uplink transmissions that use PUR may be acknowledged by the base station based on a QOS associated with the uplink transmissions.

30 Claims, 26 Drawing Sheets

(51) Int. Cl.
*H04L 5/00* (2006.01)
*H04W 24/08* (2009.01)
*H04W 72/04* (2023.01)
*H04W 72/21* (2023.01)
*H04W 72/51* (2023.01)
*H04W 72/53* (2023.01)
*H04W 72/563* (2023.01)
*H04W 76/27* (2018.01)
*H04W 76/36* (2018.01)
*H04W 80/02* (2009.01)
*H04W 80/08* (2009.01)

(52) U.S. Cl.
CPC ............ *H04W 72/21* (2023.01); *H04W 76/27* (2018.02); *H04W 80/02* (2013.01); *H04W 80/08* (2013.01)

(58) Field of Classification Search
CPC ........ G06F 2209/503; H04W 72/1284; H04W 74/0833; H04W 72/042; H04W 76/27; H04W 75/1289; H04W 76/11; H04W 72/04; H04W 72/1268
USPC .......................................... 370/329; 455/450
See application file for complete search history.

(56) References Cited

U.S. PATENT DOCUMENTS

| | | | | |
|---|---|---|---|---|
| 2012/0113832 A1* | 5/2012 | Montojo | ............... | H04L 1/0026 370/252 |
| 2013/0084869 A1* | 4/2013 | Johansson | ............. | H04W 76/20 455/436 |
| 2013/0223301 A1* | 8/2013 | Lee | ........................ | H04L 1/1854 370/281 |
| 2013/0235768 A1* | 9/2013 | Earnshaw | ............. | H04L 1/1671 370/280 |
| 2013/0250782 A1* | 9/2013 | Nimbalker | ............ | H04L 1/0038 370/252 |
| 2013/0301434 A1* | 11/2013 | Krishnamurthy | ..... | H04W 56/00 370/252 |
| 2014/0307695 A1* | 10/2014 | Yang | ..................... | H04L 1/1861 370/329 |
| 2016/0205661 A1* | 7/2016 | Ryu | ...................... | H04W 36/30 455/458 |
| 2016/0374048 A1* | 12/2016 | Griot | ....................... | H04W 4/70 |
| 2017/0215188 A1* | 7/2017 | Kim | ........................ | H04L 5/0091 |
| 2018/0176340 A1* | 6/2018 | Huang | .................. | H04L 61/103 |
| 2018/0198572 A1* | 7/2018 | Wang | ................. | H04W 28/0278 |
| 2018/0220447 A1* | 8/2018 | Kim | .................. | H04W 72/0406 |
| 2020/0067680 A1* | 2/2020 | Nayeb Nazar | .... | H04W 72/0453 |
| 2020/0092905 A1* | 3/2020 | Vos | ........................ | H04W 72/14 |
| 2020/0107396 A1* | 4/2020 | Wang | .................... | H04W 72/23 |
| 2021/0345372 A1* | 11/2021 | Li | .......................... | H04W 48/12 |
| 2021/0352690 A1* | 11/2021 | Shin | ....................... | H04L 5/0053 |
| 2021/0352691 A1* | 11/2021 | Li | .......................... | H04W 12/08 |

OTHER PUBLICATIONS

Nokia et al., "Transmission in Preconfigured UL Resources", 3GPP Draft; R1-1812929_NBIOT_TRANS_IN_PUR, 3rd Generation Partnership Project (3GPP), Mobile Competence Centre ; 650, Route Des Lucioles ; F-06921 Sophia-Antipolis Cedex ; France, vol. RAN WG1, No. Spokane, USA; Nov. 12, 2018-Nov. 16, 2018, Nov. 11, 2018 (Nov. 11, 2018), XP051554893, 5 Pages, Retrieved from the Internet: URL:http://www.3gpp.org/ftp/Meetings%5F3GPP%5FSYNC/RAN1/Docs/R1%2D1812929%2Ezip [retrieved on Nov. 11, 2018], p. 3.

Sierra Wireless: "Pre-configured UL Resources Design Considerations", 3GPP Draft; R2-1817940, 3rd Generation Partnership Project (3GPP), Mobile Competence Centre; 650, Route Des Lucioles; F-06921 Sophia-Antipolis Cedex; France, vol. RAN WG2, No. Spokane, USA; Nov. 12, 2018-Nov. 16, 2018, Nov. 2018 (Nov. 12, 2018), XP051557451, 9 Pages, Retrieved from the Internet: URL:http://www.3gpp.org/ftp/Meetings%5F3GPP%5FSYNC/RAN2/Docs/R2%2D1817940%2Ezip [retrieved on Nov. 12, 2018], paragraph [0003].

ZTE: "Support For Transmission In Preconfigured UL Resources for NB-IoT", 3GPP Draft; R1-1812774 Support for Transmission in Preconfigured UL Resources for NB-IoT-R2, 3rd Generation Partnership Project (3GPP), Mobile Competence Centre ; 650, Route Des Lucioles ; F-06921 SO, vol. RAN WG1, No. Spokane, USA; Nov. 12, 2018-Nov. 16, 2018, Nov. 11, 2018 (Nov. 11, 2018), XP051554732, 7 Pages, Retrieved from the Internet: URL:http://www.3gpp.org/ftp/Meetings%5F3GPP%5FSYNC/RAN1/Docs/R1%2D1812774%2Ezip [retrieved on Nov. 11, 2018], paragraph [02.3].

Huawei, et al., "Impact of Uplink Grant Skipping on PHR", 3GPP TSG-RAN WG2 Meeting 103, R2-1812774, Gothenburg, Sweden, Aug. 20-24, 2018, 2 pages.

* cited by examiner

PRECONFIGURED UPLINK RESOURCE TECHNIQUES IN WIRELESS COMMUNICATIONS

CROSS REFERENCE

The present Application for Patent claims the benefit of U.S. Provisional Patent Application No. 62/797,168 by PHUYAL et al., entitled "PRECONFIGURED UPLINK RESOURCE TECHNIQUES IN WIRELESS COMMUNICATIONS," filed Jan. 25, 2019, assigned to the assignee hereof, and expressly incorporated herein.

BACKGROUND

The following relates generally to wireless communications, and more specifically to preconfigured uplink resource techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may have a relatively small amount of data to be transmitted periodically. For example, a UE may be associated with a sensor that is to provide readings to a network node on a periodic basis. In some cases, in order to obtain uplink resources for an uplink transmission, a UE may transmit a request for uplink data resources (e.g., a buffer status report (BSR) may be provided to a base station that indicates that the UE has data to transmit), receive an uplink grant responsive to the request, and then transmit uplink data in accordance with the uplink grant. In cases where the UE has relatively small amounts of data to transmit, such procedures consume a substantial amount of overhead relative to the amount of data transmitted. Efficient techniques to allocate uplink resources to UEs for "grant-free" uplink transmissions (i.e., without needing to perform multi-step communication just to obtain an uplink grant every time) may allow for more efficient network operation through allocation of such uplink resources and reduced overhead associated with such uplink transmissions.

SUMMARY

The described techniques relate to improved methods, systems, devices, and apparatuses that support preconfigured uplink resources (PUR) in wireless communications. Various described techniques provide for communicating that support for PUR is available at a base station and allocating PUR resources to user equipment (UE) based on requests from UEs. A UE may receive an indication that the base station supports PUR, such as via a system information block (SIB), determine to request PUR, and transmit a PUR request message to the base station. A PUR response from the base station may indicate a PUR allocation for the UE that may be used for uplink transmissions.

In some cases, a UE may determine a quality of service (QOS) associated with uplink data from the UE. In some cases, the UE may indicate in the PUR request (e.g., based on the determined QOS) that acknowledged mode (AM) communications are desired where acknowledgments of PUR transmissions are provided via layer two or layer three acknowledgments, or that unacknowledged mode (UM) communications where acknowledgments of PUR transmissions are provided via layer one hybrid automatic repeat request (HARM) acknowledgments are sufficient. The UE may transmit the PUR request to the base station, and may receive a PUR response that configures (or reconfigures) a PUR allocation for the UE. In some cases, the UE may receive a PUR response that rejects the PUR request, such as when a sufficient PUR allocation is unavailable at the base station. The UE, in cases where a PUR allocation is provided by the base station, may transmit AM or UM uplink transmissions using the PUR resources. In cases where AM transmissions are sent (and in some cases where UM transmissions are sent), the UE may monitor for an acknowledgment from the base station.

A method of wireless communication at a UE is described. The method may include determining that a base station supports PUR for uplink transmissions from the UE using PUR, transmitting a PUR request message to the base station based on the determining that the base station supports PUR, where the PUR request message indicates whether layer one HARQ acknowledgment of PUR transmissions is requested, receiving a PUR configuration from the base station that identifies PUR allocated to the UE, and transmitting one or more uplink data transmissions to the base station via the PUR allocated to the UE.

An apparatus for wireless communication at a UE is described. The apparatus may include a processor, memory in electronic communication with the processor, and instructions stored in the memory. The instructions may be executable by the processor to cause the apparatus to determine that a base station supports PUR for uplink transmissions from the UE using PUR, transmit a PUR request message to the base station based on the determining that the base station supports PUR, where the PUR request message indicates whether layer one HARQ acknowledgment of PUR transmissions is requested, receive a PUR configuration from the base station that identifies PUR allocated to the UE, and transmit one or more uplink data transmissions to the base station via the PUR allocated to the UE.

Another apparatus for wireless communication at a UE is described. The apparatus may include means for determining that a base station supports PUR for uplink transmissions from the UE using PUR, transmitting a PUR request message to the base station based on the determining that the base station supports PUR, where the PUR request message indicates whether layer one HARQ acknowledgment of PUR transmissions is requested, receiving a PUR configuration from the base station that identifies PUR allocated to the UE, and transmitting one or more uplink data transmissions to the base station via the PUR allocated to the UE.

A non-transitory computer-readable medium storing code for wireless communication at a UE is described. The code may include instructions executable by a processor to determine that a base station supports PUR for uplink transmissions from the UE using PUR, transmit a PUR request message to the base station based on the determining that the base station supports PUR, where the PUR request message indicates whether layer one HARQ acknowledgment of PUR transmissions is requested, receive a PUR configuration from the base station that identifies PUR allocated to the UE, and transmit one or more uplink data transmissions to the base station via the PUR allocated to the UE.

Some examples of the method, apparatuses, and non-transitory computer-readable medium described herein may further include operations, features, means, or instructions for identifying data traffic at the UE to be transmitted via the PUR, determining a QOS associated with the data traffic, and formatting the PUR request message based on the data traffic and the QOS associated with the data traffic. In some examples of the method, apparatuses, and non-transitory computer-readable medium described herein, the UE may format the PUR request message to request acknowledgment of PUR transmissions via radio resource control (RRC) acknowledgments or to request the layer one HARQ acknowledgment of PUR transmissions. In some examples of the method, apparatuses, and non-transitory computer-readable medium described herein, the determining the QOS includes determining to request acknowledged mode communications.

Some examples of the method, apparatuses, and non-transitory computer-readable medium described herein may further include operations, features, means, or instructions for initiating a retransmission timer responsive to transmitting a first uplink data transmission to the base station, and monitoring, during a time period associated with the retransmission timer, for an acknowledgment from the base station that indicates the first uplink data transmission was received at the base station. Some examples of the method, apparatuses, and non-transitory computer-readable medium described herein may further include operations, features, means, or instructions for retransmitting the first uplink data transmission responsive to the retransmission timer expiring prior to receiving the acknowledgment from the base station. Some examples of the method, apparatuses, and non-transitory computer-readable medium described herein may further include operations, features, means, or instructions for receiving the acknowledgment from the base station, and discontinuing the retransmission timer.

In some examples of the method, apparatuses, and non-transitory computer-readable medium described herein, the acknowledgment from the base station may be a layer one HARQ acknowledgment, a layer two acknowledgment, or layer three acknowledgment from the base station provided via one or more of a medium access control (MAC) control element (MAC-CE), a RLC status report, a packet data convergence protocol (PDCP) status report, a RRC message, or any combinations thereof.

In some examples of the method, apparatuses, and non-transitory computer-readable medium described herein, the determining the QOS includes determining to request unacknowledged mode communications. In some examples of the method, apparatuses, and non-transitory computer-readable medium described herein, the UE is configured for user-plane (UP) cellular Internet of things (CIoT) evolved packet system (EPS) optimization, control-plane (CP) CIoT EPS optimization, CP CIoT 5GS optimization, or UP CIoT 5GS optimization, and the PUR request message indicates that layer two or layer three acknowledgment of PUR transmissions is requested.

In some examples of the method, apparatuses, and non-transitory computer-readable medium described herein, the determining that the base station supports PUR for uplink transmissions includes receiving a SIB from the base station that indicates PUR support. In some examples of the method, apparatuses, and non-transitory computer-readable medium described herein, the SIB indicates one or more of acknowledged mode (AM) PUR support, unacknowledged mode (UM) PUR support, or combinations thereof. In some examples of the method, apparatuses, and non-transitory computer-readable medium described herein, the SIB indicates AM PUR support for a first set of resources, and UM PUR support for a second set of resources, and where the PUR request message indicates an AM PUR request or a UM PUR request. In some examples of the method, apparatuses, and non-transitory computer-readable medium described herein, the PUR request message includes a requested type of acknowledgments of PUR transmissions that indicates whether the UE requests that acknowledgments of PUR transmissions be provided via layer two or layer three signaling, or that the UE requests that acknowledgments of PUR transmissions be provided via layer one HARQ acknowledgments, wherein the requested type of acknowledgments of PUR transmissions is an explicit request or an implicit request, and where the implicit request may be based on a default mode of operation or an indicated capability of the base station. In some examples of the method, apparatuses, and non-transitory computer-readable medium described herein, the PUR configuration provides an explicit indication of an AM PUR allocation or a UM PUR allocation to the UE, or an implicit indication of the AM PUR allocation or the UM PUR allocation to the UE, and where the implicit indication may be based on one or more of a requested mode in the PUR request, a default mode of operation, an indicated capability of the base station, or any combinations thereof.

In some examples of the method, apparatuses, and non-transitory computer-readable medium described herein, the transmitting the PUR request message to the base station may be performed via uplink resources provided to the UE in one or more of an uplink grant, a semi-persistent scheduling (SPS) uplink grant, an early data transmission (EDT) of a random access procedure, a different PUR resource, or any combinations thereof.

In some examples of the method, apparatuses, and non-transitory computer-readable medium described herein, the UE may be in an idle mode prior to transmitting the one or more uplink data transmissions and returns to the idle mode upon completion of the one or more uplink data transmissions. In some examples of the method, apparatuses, and non-transitory computer-readable medium described herein, the one or more uplink data transmissions from the UE may be transmitted using a RRC PUR message.

In some examples of the method, apparatuses, and non-transitory computer-readable medium described herein, the UE may have a prior PUR allocation prior to the transmitting the PUR request message, and the PUR request message requests a reconfiguration of the prior PUR allocation, the PUR configuration indicates the PUR request may be rejected by the base station, and the UE, responsive to the rejected PUR request, performs one of releasing an existing PUR allocation, maintaining the prior PUR allocation, or requesting other uplink resources from the base station. Some examples of the method, apparatuses, and non-transitory computer-readable medium described herein may further include operations, features, means, or instructions for transmitting, responsive to receiving the PUR configuration, a PUR configuration complete message to the base station.

A method of wireless communication at a base station is described. The method may include identifying a set of PUR for uplink transmissions from a UE to the base station, transmitting an indication of the set of PUR to one or more UEs, receiving a PUR request message from a first UE, where the PUR request message indicates whether layer one HARQ acknowledgment of PUR transmissions is requested, determining a PUR configuration for the first UE that identifies a PUR allocation for the first UE, and transmitting the PUR configuration to the first UE.

An apparatus for wireless communication at a base station is described. The apparatus may include a processor, memory in electronic communication with the processor, and instructions stored in the memory. The instructions may be executable by the processor to cause the apparatus to identify a set of PUR for uplink transmissions from a UE to the base station, transmit an indication of the set of PUR to one or more UEs, receive a PUR request message from a first UE, where the PUR request message indicates whether layer one HARQ acknowledgment of PUR transmissions is requested, determine a PUR configuration for the first UE that identifies a PUR allocation for the first UE, and transmit the PUR configuration to the first UE.

Another apparatus for wireless communication at a base station is described. The apparatus may include means for identifying a set of PUR for uplink transmissions from a UE to the base station, transmitting an indication of the set of PUR to one or more UEs, receiving a PUR request message from a first UE, where the PUR request message indicates whether layer one HARQ acknowledgment of PUR transmissions is requested, determining a PUR configuration for the first UE that identifies a PUR allocation for the first UE, and transmitting the PUR configuration to the first UE.

A non-transitory computer-readable medium storing code for wireless communication at a base station is described. The code may include instructions executable by a processor to identify a set of PUR for uplink transmissions from a UE to the base station, transmit an indication of the set of PUR to one or more UEs, receive a PUR request message from a first UE, where the PUR request message indicates whether layer one HARQ acknowledgment of PUR transmissions is requested, determine a PUR configuration for the first UE that identifies a PUR allocation for the first UE, and transmit the PUR configuration to the first UE.

In some examples of the method, apparatuses, and non-transitory computer-readable medium described herein, the PUR request message indicates a QOS associated with the first UE, and where the PUR configuration may be determined based on the QOS associated with the first UE. In some examples of the method, apparatuses, and non-transitory computer-readable medium described herein, the PUR request message is formatted to request acknowledgment of PUR transmissions via RRC acknowledgments or to request the layer one HARQ acknowledgment of PUR transmissions. In some examples of the method, apparatuses, and non-transitory computer-readable medium described herein, the QOS indicates that the UE is requesting acknowledged mode communications via the PUR.

Some examples of the method, apparatuses, and non-transitory computer-readable medium described herein may further include operations, features, means, or instructions for receiving a first uplink data transmission via the PUR allocation for the first UE, and transmitting an acknowledgment to the first UE that indicates the first uplink data transmission was received at the base station. In some examples of the method, apparatuses, and non-transitory computer-readable medium described herein, the acknowledgment may be a layer one HARQ acknowledgment, a layer two acknowledgment, or layer three acknowledgment transmitted to the UE via one or more of a MAC-CE, a RLC status report, a PDCP status report, a RRC message, or any combinations thereof.

In some examples of the method, apparatuses, and non-transitory computer-readable medium described herein, the QOS indicates that the UE may be requesting unacknowledged mode communications via the PUR.

In some examples of the method, apparatuses, and non-transitory computer-readable medium described herein, the indication of the set of PUR may be provided in a SIB. In some examples of the method, apparatuses, and non-transitory computer-readable medium described herein, the SIB indicates one or more of acknowledged mode (AM) PUR support, unacknowledged mode (UM) PUR support, or combinations thereof.

In some examples of the method, apparatuses, and non-transitory computer-readable medium described herein, the PUR request message may be received from the first UE via uplink resources provided to the UE in one or more of an uplink grant, a SPS uplink grant, an EDT of a random access procedure, a different PUR resource, or any combinations thereof.

DETAILED DESCRIPTION

Figure 1:
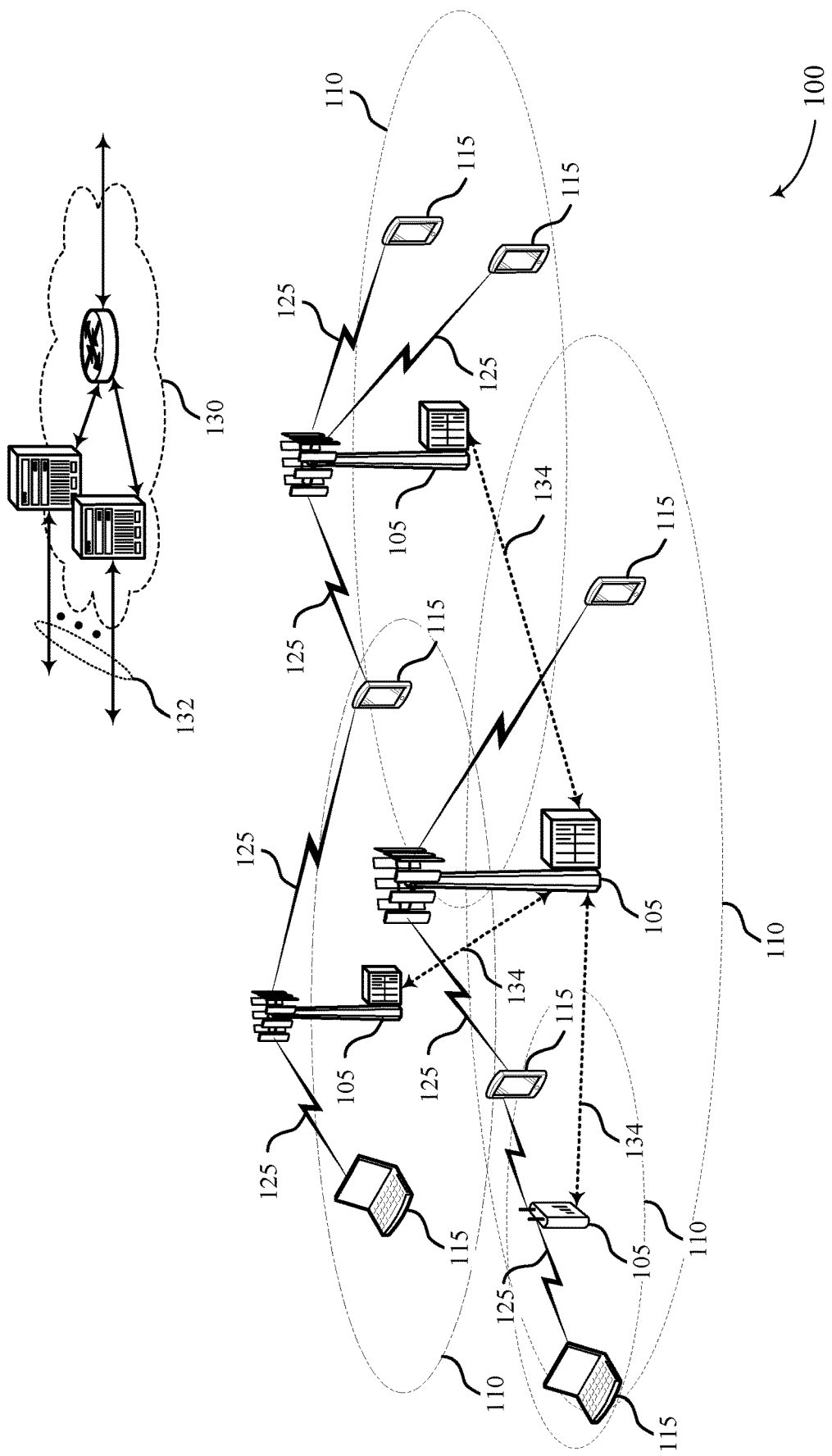
FIG. 1 illustrates an example of a system for wireless communications that supports preconfigured uplink resource techniques in wireless communications in accordance with aspects of the present disclosure.

Various aspects of the present disclosure provide improved methods, systems, devices, and apparatuses that support signaling and configuration related to preconfigured uplink resources (PUR). Various described techniques provide for communicating that PUR resources are available at a base station, such as via a system information block (SIB) transmission that indicates support for PUR. A UE may receive the indication of support for PUR, and may determine to request PUR resources from a base station (e.g., based on uplink data to be transmitted to the base station). The UE, in some cases, may transmit a PUR request message requesting PUR resources. The base station may receive the PUR request message and determine whether to allocate PUR resources to the UE. The base station may transmit a PUR response with a PUR allocation to the UE in cases where the base station determines to allocate PUR resources to the UE, or may transmit a PUR rejection message to the UE in cases where the base station determines that no PUR resources are available to allocate to the UE.

In some cases, the UE may determine a quality of service (QOS) associated with uplink data from the UE. In some cases, the UE may indicate in the PUR request (e.g., based on the QOS) that acknowledged mode (AM) communications are desired where acknowledgments of PUR transmissions are provided via layer two or layer three acknowledgments, or that unacknowledged mode (UM) communications where acknowledgments of PUR transmissions are provided via layer one hybrid automatic repeat request (HARQ) acknowledgments are sufficient. The UE may transmit the PUR request to the base station, and may receive a PUR response that configures (or reconfigures) a PUR allocation for the UE (or a PUR rejection message). The UE, in cases where a PUR allocation is provided by the base station, may transmit AM or UM uplink transmissions using the PUR resources. In cases where AM transmissions are sent, the UE may monitor for an acknowledgment from the base station. In cases where UM transmissions are sent, or in cases where AM transmissions are sent, the UE may monitor for hybrid acknowledgment receipt request (HARQ) acknowledgment from the base station. In other cases where UM transmissions are sent, the UE may simply send the UM uplink transmission and return to IDLE mode without monitoring for an acknowledgment (e.g., the UE transmits a "fire-and-forget" UL message to the base station).

Such techniques may allow for a single message data transmission from a UE. Such a single message transmission may have reduced overhead relative to other techniques for uplink transmissions of relatively small amounts of data, such as techniques that employ a four-step uplink (UL) "random access" procedure, allowing data transmission in a fifth message (MSG5), or techniques that provide for an "Early Data Transmission (EDT)," which provide support for a two-step uplink access procedure, allowing for data transmission in a third message (MSG3). In cases that use legacy random access procedures, or EDT procedures, such techniques still rely on a grant from a base station before a UE in IDLE mode can transmit uplink data. Single message uplink transmissions from a UE in IDLE mode and having an up to date timing advance (TA), as discussed herein, may be supported that have overhead that is further reduced relative to random access or EDT techniques. Such reduced overhead may enhance transmission efficiency and reduce power consumption. In some cases, UEs having relatively small amounts of data to transmit at certain intervals (e.g., enhanced machine type communication (eMTC) UEs, or narrowband Internet of Things (NB-IoT) UEs) that remain stationary (i.e., have an up to date TA) may benefit from the reduced signaling overhead of techniques such as discussed herein.

Aspects of the disclosure are initially described in the context of a wireless communications system. Several exemplary process flows are then discussed for signaling between UEs and base stations to configure and use PUR resources. Aspects of the disclosure are further illustrated by and described with reference to apparatus diagrams, system diagrams, and flowcharts that relate to PUR techniques in wireless communications.

FIG. 1 illustrates an example of a wireless communications system 100 that supports PUR techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

In some cases, UEs 115 and base stations 105 may use PUR to help reduce signaling overhead associated with uplink transmissions. In some cases, a base station 105 may transmit an indication of PUR support (e.g., via a SIB). A UE 115 may receive the indication, and transmit a PUR request to the base station 105. A PUR response from the base station 105 may indicate a PUR allocation for the UE 115 that may be used for uplink transmissions. In some cases, the UE 115 may determine a QOS associated with uplink data to be transmitted using PUR that may indicate that AM communications are desired at the UE 115, or that UM communications are sufficient. The UE 115 may transmit the PUR request to the base station indicating the QOS, and may receive a PUR response that configures (or reconfigures) a PUR allocation for the UE 115. In some cases, the UE 115 may receive a PUR response that rejects the PUR request, such as when a sufficient PUR allocation is unavailable at the base station 105. The UE 115, in cases where a PUR allocation is provided by the base station 105, may transmit AM or UM uplink transmissions using the PUR resources. In cases where AM transmissions are sent (and in some cases where UM transmissions are sent), the UE 115 may monitor for an acknowledgment from the base station 105.

Figure 2:
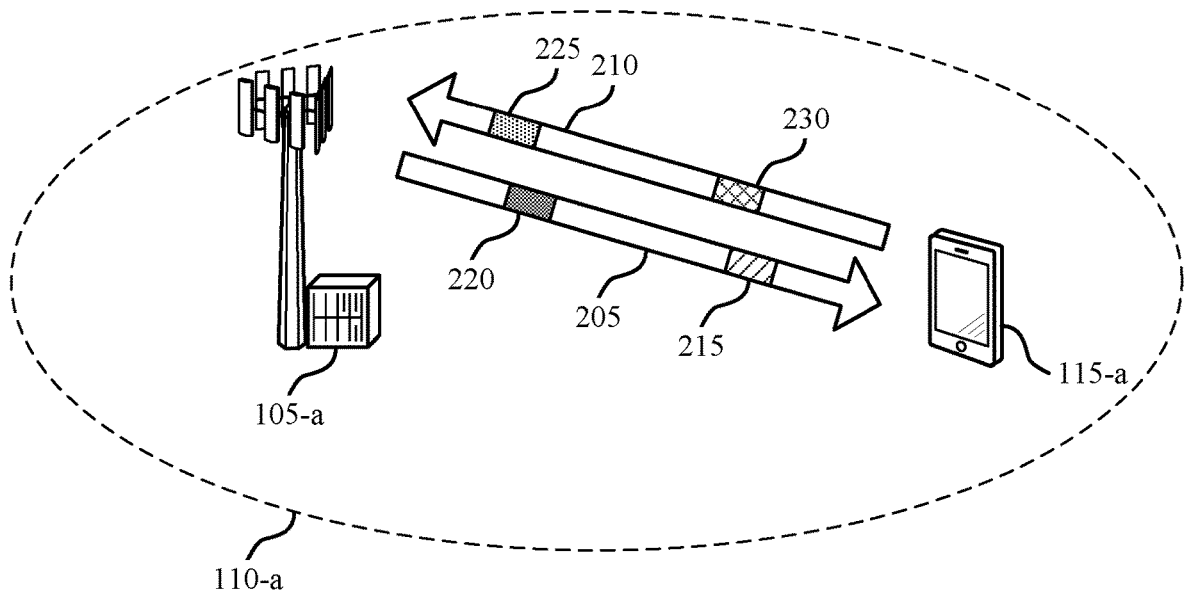
FIG. 2 illustrates an example of a portion of a wireless communications system that supports PUR techniques in wireless communications in accordance with aspects of the present disclosure.

FIG. 2 illustrates an example of a wireless communications system 200 that supports PUR techniques in wireless communications in accordance with aspects of the present disclosure. In some examples, wireless communications system 200 may implement aspects of wireless communications system 100. In some examples, the wireless communications system 200 may include a base station 105-*a* and UE 115-*a*, which may be examples of the corresponding devices as described with reference to FIG. 1. UE 115-*a* may communicate with the base station 105-*a* within a coverage area 110-*a* via downlink transmissions 205 and uplink transmissions 210.

In some cases, the base station 105-*a* may configure a set of resources as PUR that may be used for uplink transmissions of the UE 115-*a*, and other UEs that may be served by the base station 105-*a*. In some cases, the UE 115-*a* and base station 105-*a* may operate using eMTC or NB-IoT communications, and the UE 115-*a* may have periodic transmissions of relatively small amounts of data, such as data associated with a sensor reading or a device status. In some cases, the UE 115-*a* may be stationary, or may move within a relatively small area (e.g., in a factory automation deployment), and may thus have an up to date timing advance (TA) for synchronizing uplink transmissions to the base station 105-*a* even when the UE 115-*a* comes out of IDLE mode to send an uplink transmission.

In some cases, the base station 105-*a* may provide a PUR indication 215 that indicates support for PUR at the base station 105-*a*. Such an indication may be provided, for example, in a SIB or other downlink signaling (e.g., in a physical broadcast channel (PBCH) transmitted with a synchronization signal block (SSB), remaining minimum system information (RMSI), etc.). The UE 115-*a* may receive the PUR indication 215 and determine that data transmission needs at the UE 115-*a* would benefit from uplink transmissions. For example, if the UE 115-*a* has periodic uplink transmissions that are less than a transmission size threshold, the UE 115-*a* may determine to request PUR resources from the base station 105-*a*. Additionally or alternatively, if the UE 115-*a* has relatively high priority traffic (e.g., data traffic for critical systems or safety-related information) the UE 115-*a* may determine to request PUR resources from the base station 105-*a*. In some cases, the PUR indication 215 may provide an indication of a data size for the associated uplink transmissions that the UE 115-*a* may use to determine to request PUR resources.

The UE 115-*a* may determine to request PUR resources, and may transmit a PUR request 225 to the base station 105-*a*. The UE 115-*a* may be in connected mode (e.g., in RRC CONNECTED mode) when it sends PUR request 225 in some cases, and may transmit the message using a dynamic uplink grant (e.g., uplink resources allocated by the base station 105-*a* and indicated to the UE 115-*a* in downlink control information (DCI)), or in a preconfigured grant (e.g., a semi-persistent scheduling (SPS) grant previously provided to the UE 115-*a*). In some cases, the UE 115-*a* may be in IDLE mode (e.g., RRC IDLE mode) and use EDT to send the PUR request 225 in cases where the base station 105-*a* supports EDT. Further, in some cases the UE 115-*a* may have an existing PUR allocation and may use the previously configured PUR to send PUR request 225 for a reconfiguration of the existing PUR allocation.

The base station 105-*a* may receive the PUR request 225 and determine a PUR configuration or reconfiguration for the UE 115-*a*, which may be transmitted to the UE 115-*a* in PUR allocation 220. In some cases, the base station 105-*a* may determine that sufficient PUR resources are not available for the request from the UE 115-*a* (e.g., due to other UEs having higher priority data using PUR resources), and may transmit a PUR rejection message. The UE 115-*a*, upon receiving such a PUR rejection message may fall back to legacy uplink techniques (e.g., legacy random access procedures, or EDT procedures), may continue to use an existing PUR allocation, or may cancel an existing PUR configuration (e.g., based on an indication in the rejection message or based on a default behavior when such a message is received). In some cases, the UE 115-*a* may optionally acknowledge that the PUR allocation 220 (or rejection) was received. In cases where the UE 115-*a* is configured, or reconfigured, with a PUR allocation, the UE 115-*a* may then transmit uplink data 230 using the resources indicated in PUR. In such a manner, the UE 115-*a* may be in idle mode and may transmit uplink data in a single uplink transmission (e.g., similar to a random access MSG1 transmission using the PUR allocation).

In some cases, the uplink transmissions using PUR may be AM transmissions in which the base station 105-*a* provides a layer2/layer3 (L2/L3) acknowledgment of receipt of the transmission in addition to a HARQ acknowledgment in some cases, or UM transmissions in which the base station 105-*a* does not provide a L2/L3 acknowledgment but may provide a HARQ acknowledgment in some cases. In some cases, the base station 105-*a* may support only AM PUR transmissions. In some cases, the base station 105-*a* may support only UM PUR transmissions. In some cases, the base station 105-*a* may support both AM and UM PUR transmissions. In some cases, the PUR configuration of the base station 105-*a* may provide a first time period to support AM only, and a second time period to support UM only. In some cases, the base station 105-*a* may configure one or more time periods that support both AM and UM PUR transmissions. In some cases, the indication of AM/UM support and associated time periods may be provided with the indication of PUR support (e.g., in a SIB the configuration indicates PUR-mode=AM or PUR-mode=UM). In other cases, AM/UM support and associated time periods may be preconfigured. In still other cases, the base station 105-*a* may provide an index into a set of PUR configurations with the indication of PUR support, and the AM/UM support and associated time periods may be determined based on PUR configurations that are mapped to different index values. In some cases, the PUR request from the UE 115-*a* may request, for example, an AM PUR allocation, and the PUR response message from the base station 105-*a* may indicate that the PUR allocation is an AM PUR allocation. In other cases, the PUR response may not provide an AM/UM indication, and the UE 115-*a* may assume that the requested AM/UM mode is allocated unless an explicit indication otherwise is provided by the base station 105-*a*. In other cases, the base station 105-*a* may simply configure PUR allocations based on the signaled AM/UM support and associated time periods.

In some cases, the UE 115-*a* may determine to request the PUR allocation based on, for example, a traffic pattern of uplink data (e.g., a size of packets, interarrival rate, etc.), a QOS requirement, or combinations thereof. In some cases, based on the QOS requirement, the UE 115-*a* may request an AM or UM PUR allocation. In some cases, for either AM or UM, physical layer (i.e., layer 1) HARQ acknowledgment techniques may be supported. In some cases, the AM or UM indication in the PUR request message may be explicit (e.g., requested-mode can have value AM or UM and signaling indicates requested-mode=AM, or requested-mode=UM). In other cases, the indication of AM or UM in the PUR request message may be optional. In this case, if such indication is absent, a default behavior may be specified (e.g., default mode is UM and an indication of am-requested=True means AM, and absent means UM). In other cases, AM or UM may depend on the indicated base station 105-*a* capabilities and the PUR configuration.

In cases where the UE 115-*a* requests AM (either explicitly or implicitly), and the base station 105-*a* provides AM PUR resources, the base station 105-*a* may provide layer2/layer3 (L2/L3) acknowledgments based on successful receipt of an uplink transmission using PUR. In some cases, the L2/L3 acknowledgements may be different if the UE 115-*a* is configured for Control-plane (CP) CIoT EPS optimization, User-plane (UP) CIoT EPS optimization, Control-plane (CP) CIoT 5GS optimization or User-plane (UP) CIoT 5GS optimization cases. For example, for the UP-case, acknowledgment may be based on a medium access control (MAC) control element (MAC-CE), that may indicate that the previous uplink transmission was successfully received. Such a MAC-CE may be included with a future downlink packet within a certain time duration, for example. In some cases, for the UP-case, the acknowledgment may be based on a radio link control (RLC) status report (e.g., N PUR uplink(s) trigger a RLC status report that is provided within a certain time duration, where N can be 1 which corresponds to each PUR uplink triggering a RLC status report). In other cases, for the UP-case, the acknowledgment may be based on a PDCP status report (e.g., N PUR uplink(s) may trigger a PDCP status report that is provided within a certain time duration, where N can be 1 which corresponds to each PUR uplink triggering a PDCP status report). In some cases, acknowledgments may be provided with a certain number of transmission slots, for example.

In some cases, RRC-layer acknowledgment may be applicable for both CP and UP cases. In such cases, RRC messages in response to a uplink transmission on PUR may be expected by the UE 115-*a*, and the base station 105-*a* may confirm receipt with a downlink RRC message. In some cases, the base station 105-*a* may instruct the UE 115-*a* to fallback to legacy methods (e.g., by sending a RRCConnectionSetup). In some cases, if the L2/L3 acknowledgment (MAC CE, RLC status report, PDCP status report, or RRC message) is not received within the time duration, the UE 115-*a* may initiate retransmission of the uplink data, using PUR or by fallback to legacy methods.

Figure 3:
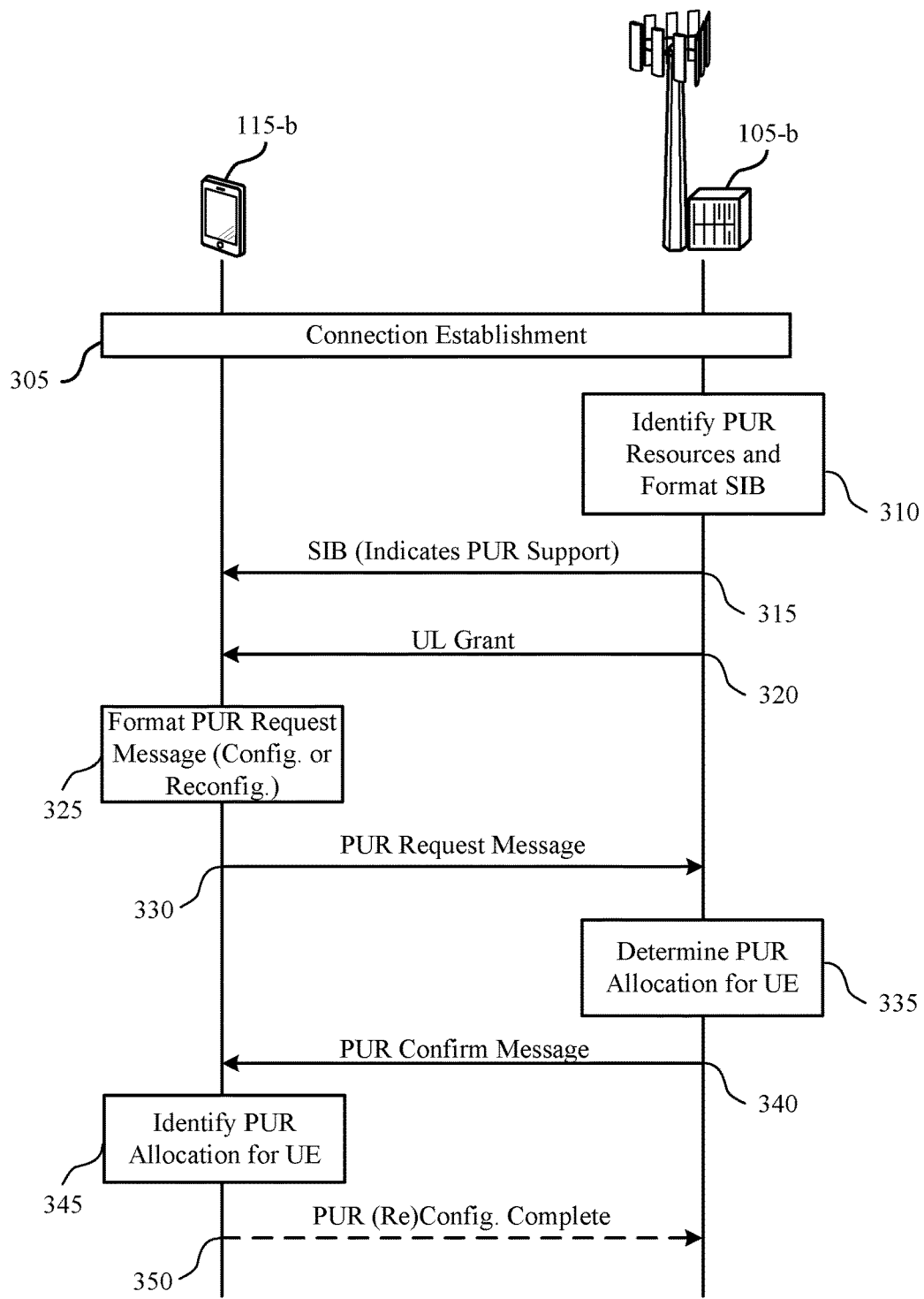
FIGS. 3 through 13 illustrate examples of process flows that support PUR techniques in wireless communications in accordance with aspects of the present disclosure.

FIG. 3 illustrates an example of a process flow 300 that supports PUR techniques in wireless communications in accordance with aspects of the present disclosure. In some examples, process flow 300 may implement aspects of wireless communications system 100 or 200. In this example, process flow 300 includes UE 115-*b* and base station 105-*b*, which may be examples of the corresponding devices described with reference to FIGS. 1 and 2.

At 305, the base station 105-*b* and UE 115-*b* may perform a connection establishment (e.g., RRC Connection establishment). Such a connection establishment may be performed using connection establishment procedures that are established for wireless communications (e.g., using random access techniques established in LTE or NR systems).

At 310, the base station 105-*b* may identify PUR resources and format a SIB that indicates PUR support. In some cases, the SIB may provide information for various PUR parameters, such as an amount of data that may be transmitted in uplink transmissions using the PUR resources, a traffic or service priority associated with the PUR resources, etc. In some cases, the SIB may provide an index into a preconfigured mapping of PUR configurations. In some cases, the base station 105-*b* may configure a number of different sets of PUR resources and the SIB may be formatted to indicate the multiple sets of PUR resources.

At 315, the base station 105-*b* may transmit, and the UE 115-*b* may receive, the SIB with the indication of PUR support.

In this example, the UE 115-*b* may be in connected mode, and at 320 the base station 105-*b* may provide an uplink grant to the UE 115-*b*. The uplink grant may be provided based on a buffer status report (BSR) provided by the UE 115-*b*, for example.

At 325, the UE 115-*b* may format a PUR request message. The PUR request message may request a new configuration of PUR resources, for example. In some cases, the UE 115-*b* may have an existing PUR allocation and the PUR request may be for a reconfiguration of the existing PUR allocation (e.g., based on updated data traffic at the UE 115-*b*, a change in a presence of higher priority data at the UE 115-*b*, etc.). In some cases, the PUR request message may indicate a QOS associated with the data at the UE 115-*b*, and may request an AM or UM PUR allocation based on the QOS. For example, if the UE 115-*b* has critical data or safety-related information, an AM PUR allocation may be requested and the PUR request may indicate that the UE has high priority data.

At 330, the UE 115-*b* may transmit the PUR request message. In some cases, the PUR request message may be transmitted using the uplink resources provided in the uplink grant. In other cases, as will be discussed in more detail below, the UE 115-*b* may transmit the PUR request message using other uplink resources (e.g., SPS resources, in an EDT, other existing PUR resources, etc.).

At 335, the base station 105-*b* may receive the PUR request message and determine a PUR allocation for the UE 115-*b*. In some cases, the base station 105-*b* may determine the PUR allocation based on one or more of QOS information provided in the PUR request, whether AM or UM PUR are requested, other PUR allocations to other UEs, an amount of available PUR resources, or any combinations thereof.

At 340, the base station 105-*b* may transmit a PUR confirmation message to the UE 115-*b* that indicates a PUR allocation for the UE 115-*b*. In some cases, the PUR allocation may be a new allocation for the UE 115-*b*. In other cases, the PUR allocation may be a reconfigured allocation of an existing PUR of the UE 115-*b*. In some cases, the PUR allocation may be shared by multiple different UEs, and the PUR allocation may indicate the shared resources and provide information that may be used by the UE 115-*b* to allow the base station 105-*b* to identify transmissions from the UE 115-*b* (e.g., a preamble to be provided with uplink transmissions, a spreading sequence to be applied to uplink transmissions, a cyclic shift to be applied to a sequence, and the like).

At 345, the UE 115-*b* may identify the PUR allocation provided by the base station 105-*b*. In cases where the PUR allocation is a new allocation, the UE 115-*b* may configure uplink transmissions to be transmitted using the PUR allocation. In cases, where the PUR allocation is a reconfiguration of an existing PUR allocation, the UE 115-*b* may reconfigure the PUR allocation in accordance with the new PUR allocation. At 350, the UE 115-*b* may optionally transmit a PUR configuration (or reconfiguration) complete message to the base station 105-*b*.

Figure 4:
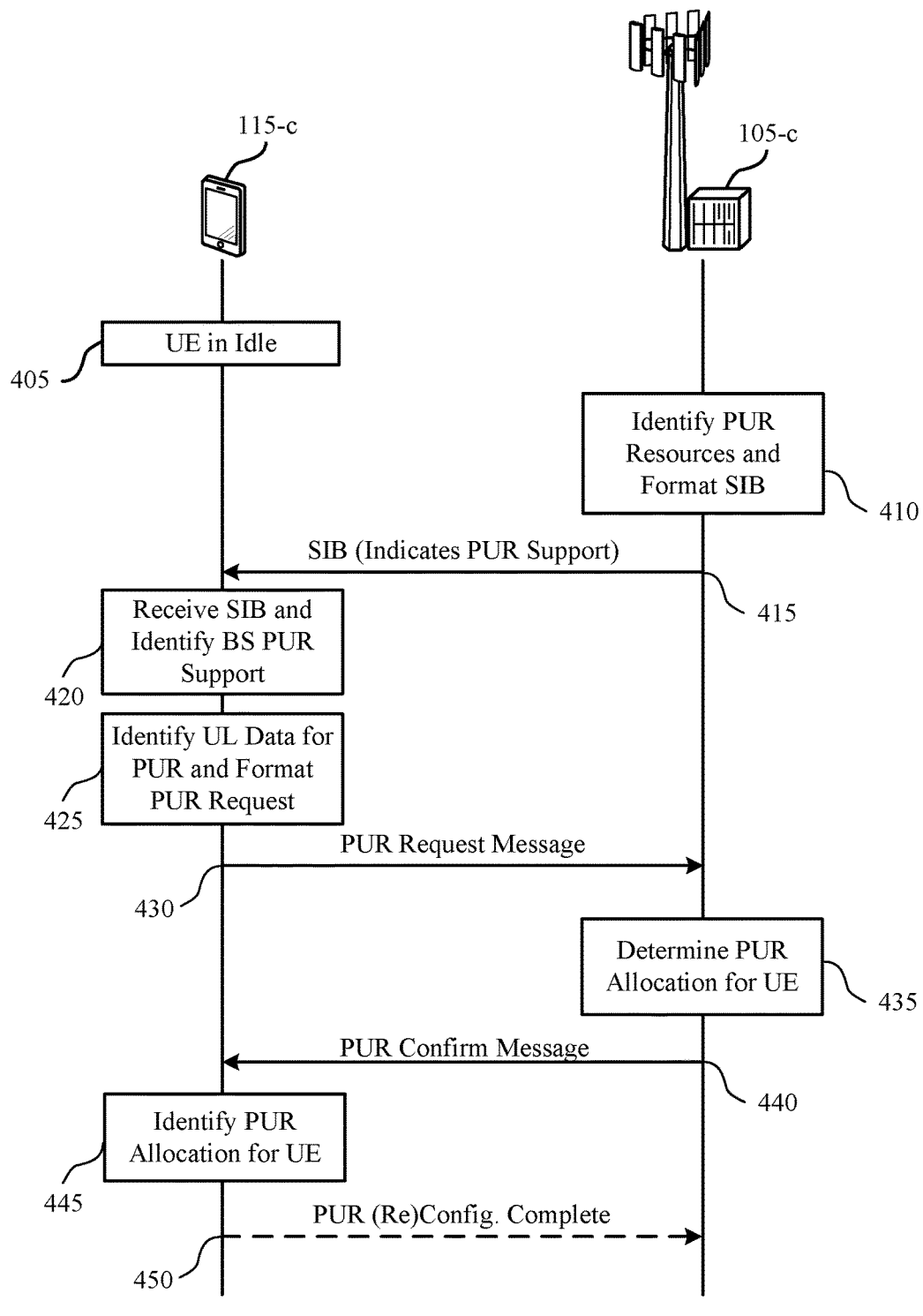

FIG. 4 illustrates an example of a process flow 400 that supports PUR techniques in wireless communications in accordance with aspects of the present disclosure. In some examples, process flow 400 may implement aspects of wireless communications system 100 or 200. In this example, process flow 400 includes UE 115-*c* and base station 105-c, which may be examples of the corresponding devices described with reference to FIGS. 1 and 2.

At 405, the UE 115-c may be in IDLE mode. In some cases, the UE 115-c may have previously performed a connection establishment and may be idle due to a lack of uplink or downlink data to be transmitted.

At 410, the base station 105-c may identify PUR resources and format a SIB that indicates PUR support. In some cases, as discussed with respect to FIG. 3, the SIB may provide information for various PUR parameters, such as an amount of data that may be transmitted in uplink transmissions using the PUR resources, a traffic or service priority associated with the PUR resources, etc. In some cases, the SIB may provide an index into a preconfigured mapping of PUR configurations. In some cases, the base station 105-c may configure a number of different sets of PUR resources and the SIB may be formatted to indicate the multiple sets of PUR resources. At 415, the base station 105-c may transmit, and the UE 115-c may receive, the SIB with the indication of PUR support.

In this example, the UE 115-c may be in idle mode, and at 420 the UE 115-c may receive the SIB and identify base station 105-c supports PUR. In some cases, the UE 115-c may periodically monitor for SIB and other downlink control transmissions while in idle mode, and may receive the SIB during such monitoring.

At 425, the UE 115-c may identify uplink data for PUR and format a PUR request message. The PUR request message may request a new configuration of PUR resources, for example. In some cases, the UE 115-c may have an existing PUR allocation and the PUR request may be for a reconfiguration of the existing PUR allocation (e.g., based on updated data traffic at the UE 115-c, a change in a presence of higher priority data at the UE 115-c, etc.). In some cases, the PUR request message may indicate a QOS associated with the data at the UE 115-c, and may request an AM or UM PUR allocation based on the QOS. For example, if the UE 115-c has critical data or safety-related information, an AM PUR allocation may be requested and the PUR request may indicate that the UE has high priority data.

At 430, the UE 115-c may transmit the PUR request message. In some cases, the PUR request message may be transmitted using, for example, SPS resources that were previously allocated to the UE 115-c. In other cases, the UE 115-c may perform a random access procedure and transmit the PUR request upon completion of the random access procedure (e.g., in a MSG5 transmission). In still other cases, the UE 115-c may have an existing PUR allocation, and may transmit the PUR request using the existing PUR allocation.

At 435, the base station 105-c may receive the PUR request message and determine a PUR allocation for the UE 115-c. In some cases, the base station 105-c may determine the PUR allocation based on one or more of QOS information provided in the PUR request, whether AM or UM PUR are requested, other PUR allocations to other UEs, an amount of available PUR resources, or any combinations thereof.

At 440, the base station 105-c may transmit a PUR confirmation message to the UE 115-c that indicates a PUR allocation for the UE 115-c. In some cases, the PUR allocation may be a new allocation for the UE 115-c. In other cases, the PUR allocation may be a reconfigured allocation of an existing PUR of the UE 115-c. In some cases, the PUR allocation may be shared by multiple different UEs, and the PUR allocation may indicate the shared resources and provide information that may be used by the UE 115-c to allow the base station 105-c to identify transmissions from the UE 115-c (e.g., a preamble to be provided with uplink transmissions, a spreading sequence to be applied to uplink transmissions, a cyclic shift to be applied to a sequence, and the like).

At 445, the UE 115-c may identify the PUR allocation provided by the base station 105-c. In cases where the PUR allocation is a new allocation, the UE 115-c may configure uplink transmissions to be transmitted using the PUR allocation. In cases, where the PUR allocation is a reconfiguration of an existing PUR allocation, the UE 115-c may reconfigure the PUR allocation in accordance with the new PUR allocation. At 450, the UE 115-c may optionally transmit a PUR configuration (or reconfiguration) complete message to the base station 105-c.

Figure 5:
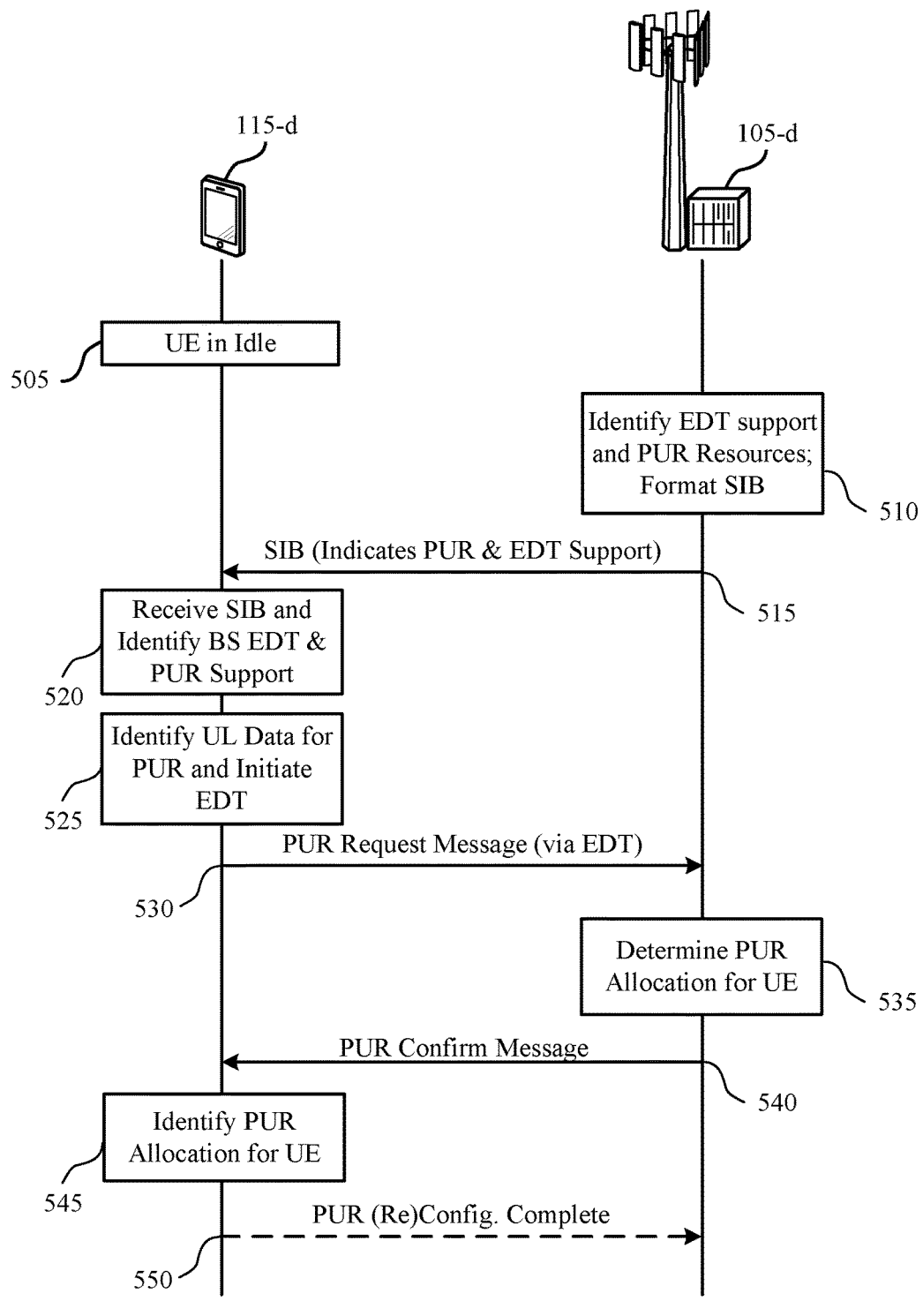

FIG. 5 illustrates an example of a process flow 500 that supports PUR techniques in wireless communications in accordance with aspects of the present disclosure. In some examples, process flow 500 may implement aspects of wireless communications system 100 or 200. In this example, process flow 500 includes UE 115-d and base station 105-d, which may be examples of the corresponding devices described with reference to FIGS. 1 and 2.

At 505, the UE 115-d may be in IDLE mode. In some cases, the UE 115-d may have previously performed a connection establishment and may be idle due to a lack of uplink or downlink data to be transmitted.

At 510, the base station 105-d may identify EDT support and PUR resources, and format a SIB that indicates PUR and EDT support. In some cases, the base station may use separate SIBs to indicate PUR and EDT support. In some cases, as discussed with respect to FIGS. 3 and 4, the SIB may provide information for various PUR parameters, such as an amount of data that may be transmitted in uplink transmissions using the PUR resources, a traffic or service priority associated with the PUR resources, etc. In some cases, the SIB may provide an index into a preconfigured mapping of PUR configurations. In some cases, the base station 105-d may configure a number of different sets of PUR resources and the SIB may be formatted to indicate the multiple sets of PUR resources. At 515, the base station 105-d may transmit, and the UE 115-d may receive, the SIB with the indication of PUR support.

In this example, the UE 115-d may be in idle mode, and at 520 the UE 115-d may receive the SIB(s) and identify base station 105-d supports EDT and PUR. In some cases, the UE 115-d may periodically monitor for SIB and other downlink control transmissions while in idle mode, and may receive the SIB(s) during such monitoring.

At 525, the UE 115-d may identify uplink data for PUR and format a PUR request message to be transmitted in an EDT. The PUR request message may request a new configuration of PUR resources, for example. In some cases, the UE 115-d may have an existing PUR allocation and the PUR request may be for a reconfiguration of the existing PUR allocation (e.g., based on updated data traffic at the UE 115-d, a change in a presence of higher priority data at the UE 115-d, etc.). In some cases, the PUR request message may indicate a QOS associated with the data at the UE 115-d, and may request an AM or UM PUR allocation based on the QOS. For example, if the UE 115-d has critical data or safety-related information, an AM PUR allocation may be requested and the PUR request may indicate that the UE has high priority data.

At 530, the UE 115-d may transmit the PUR request message using EDT. In some cases, the UE 115-d may transmit a random access request and provide the PUR request in an EDT associated with the random access procedure, in accordance with established techniques for transmitting EDT.

At 535, the base station 105-*d* may receive the PUR request message and determine a PUR allocation for the UE 115-*d*. In some cases, the base station 105-*d* may determine the PUR allocation based on one or more of QOS information provided in the PUR request, whether AM or UM PUR are requested, other PUR allocations to other UEs, an amount of available PUR resources, or any combinations thereof.

At 540, the base station 105-*d* may transmit a PUR confirmation message to the UE 115-*d* that indicates a PUR allocation for the UE 115-*d*. In some cases, the PUR allocation may be a new allocation for the UE 115-*d*. In other cases, the PUR allocation may be a reconfigured allocation of an existing PUR of the UE 115-*d*. In some cases, the PUR allocation may be shared by multiple different UEs, and the PUR allocation may indicate the shared resources and provide information that may be used by the UE 115-*d* to allow the base station 105-*d* to identify transmissions from the UE 115-*d* (e.g., a preamble to be provided with uplink transmissions, a spreading sequence to be applied to uplink transmissions, a cyclic shift to be applied to a sequence, and the like).

At 545, the UE 115-*d* may identify the PUR allocation provided by the base station 105-*d*. In cases where the PUR allocation is a new allocation, the UE 115-*d* may configure uplink transmissions to be transmitted using the PUR allocation. In cases, where the PUR allocation is a reconfiguration of an existing PUR allocation, the UE 115-*d* may reconfigure the PUR allocation in accordance with the new PUR allocation. At 550, the UE 115-*d* may optionally transmit a PUR configuration (or reconfiguration) complete message to the base station 105-*d*.

Figure 6:
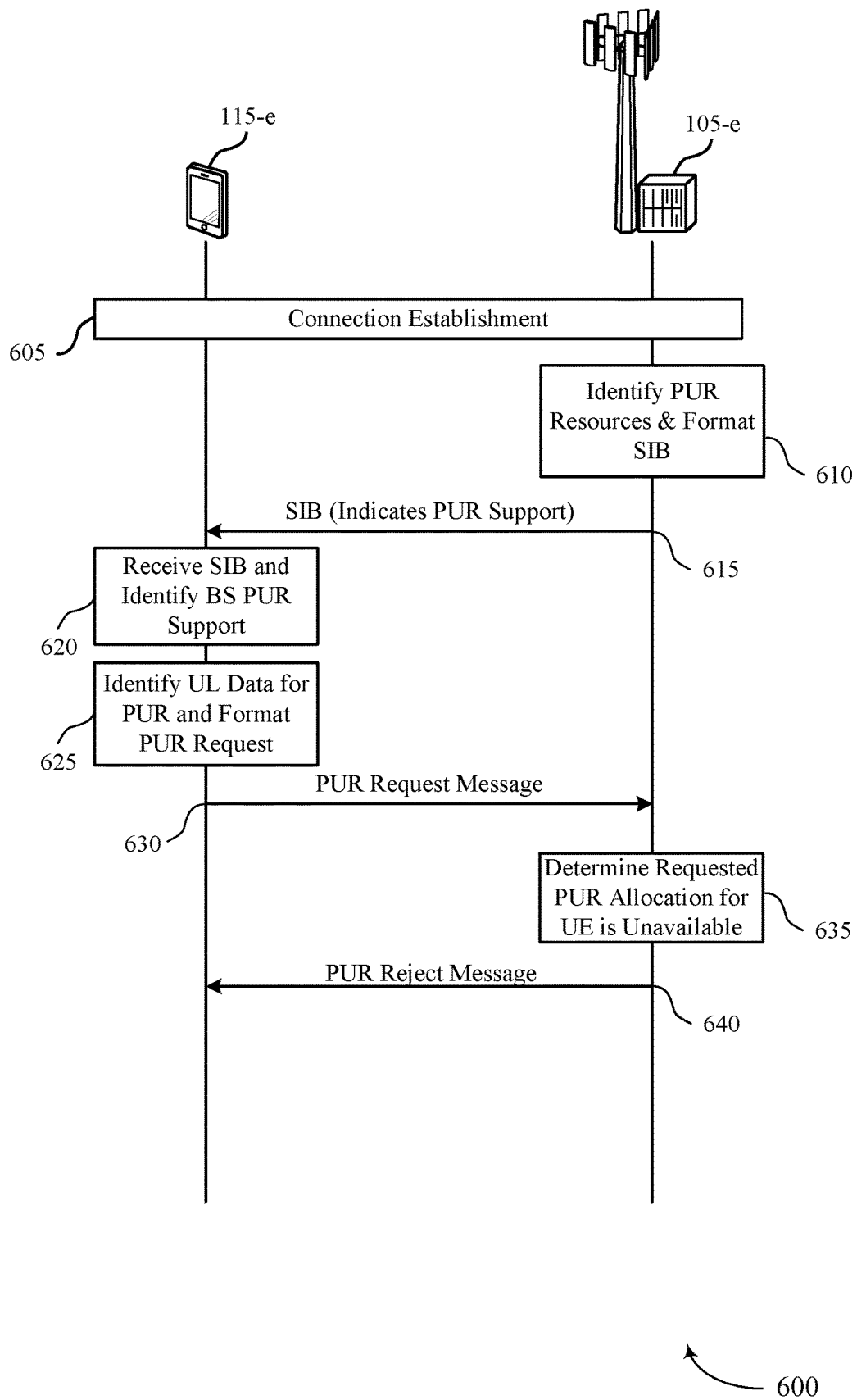
Figure 7:
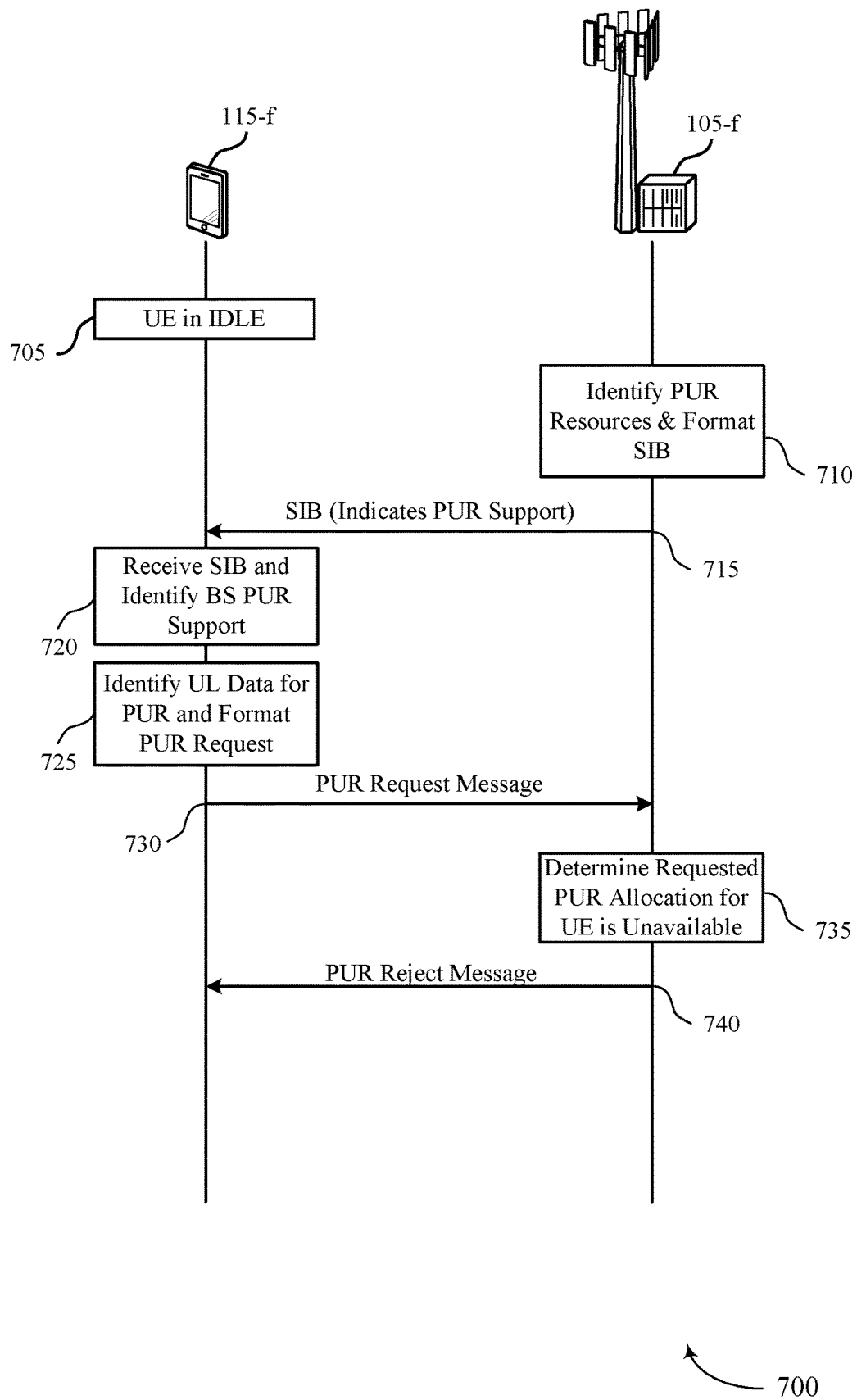
Figure 8:
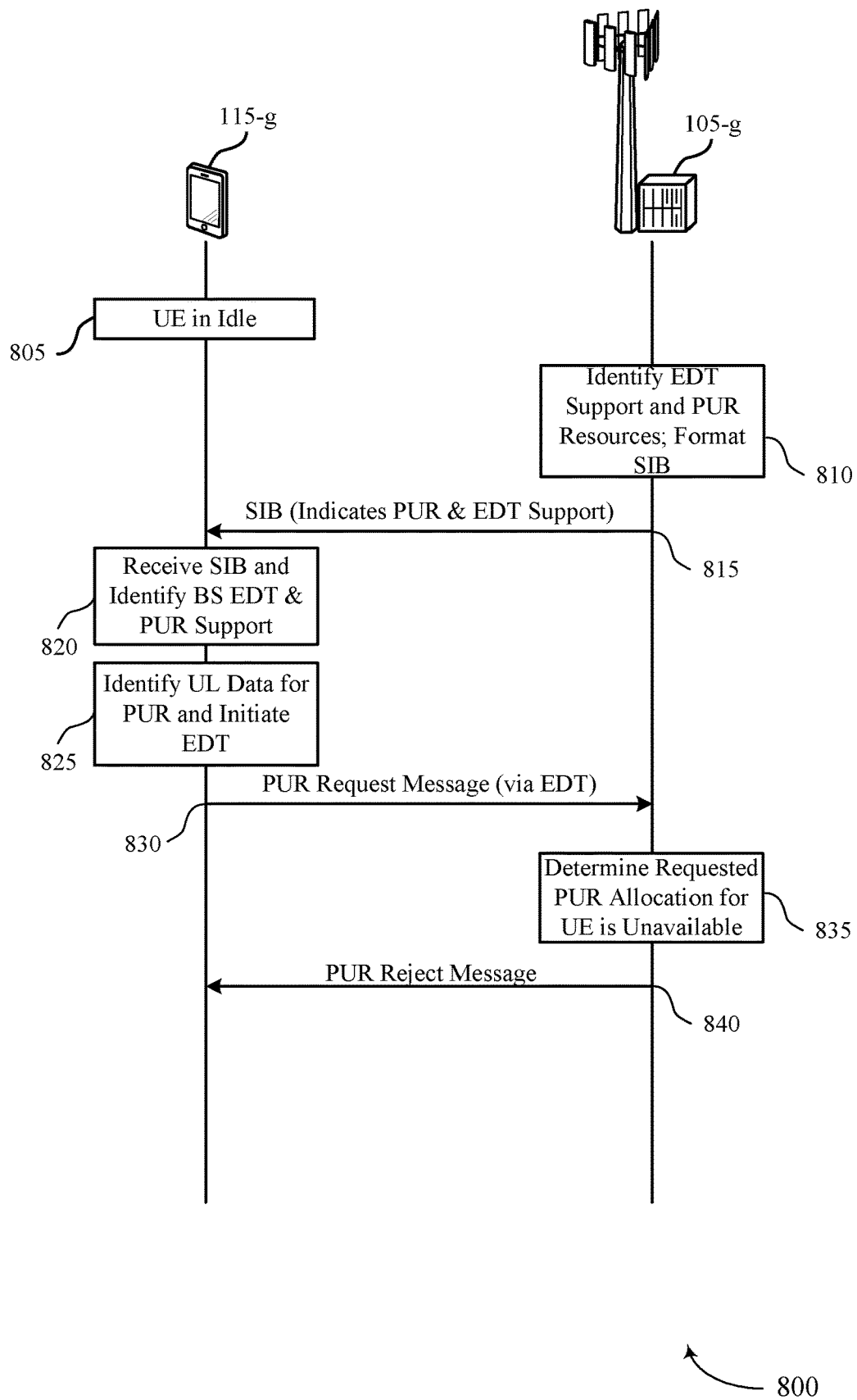

As indicated above, in some cases a base station may determine that a PUR request is to be rejected. In such cases, the base station may transmit a PUR reject message in response to receiving a PUR request. FIGS. 6 through 8 illustrate examples of process flows in which a base station may provide such a PUR reject message. FIG. 6 illustrates a first example of a process flow 600 with a PUR reject message in accordance with aspects of the present disclosure. In some examples, process flow 600 may implement aspects of wireless communications system 100 or 200. In this example, process flow 600 includes UE 115-*e* and base station 105-*e*, which may be examples of the corresponding devices described with reference to FIGS. 1 and 2.

At 605, the base station 105-*e* and UE 115-*e* may perform a connection establishment (e.g., RRC Connection establishment). Such a connection establishment may be performed using connection establishment procedures that are established for wireless communications (e.g., using random access techniques established in LTE or NR systems).

At 610, the base station 105-*e* may identify PUR resources and format a SIB that indicates PUR support. As discussed above, the SIB may provide information for various PUR parameters, such as an amount of data that may be transmitted in uplink transmissions using the PUR resources, a traffic or service priority associated with the PUR resources, etc. At 615, the base station 105-*e* may transmit, and the UE 115-*e* may receive, the SIB with the indication of PUR support.

In this example, the UE 115-*e* may be in connected mode, and at 620 the UE 115-*e* may receive the SIB and identify base station 105-*e* supports PUR. In some cases, the UE 115-*d* may receive the SIB and other downlink control transmissions from the base station 105-*e* in scheduled downlink control channel transmissions.

At 625, the UE 115-*e* may identify uplink data for PUR and format a PUR request message. The PUR request message may request a new configuration of PUR resources, for example. In some cases, the UE 115-*e* may have an existing PUR allocation and the PUR request may be for a reconfiguration of the existing PUR allocation (e.g., based on updated data traffic at the UE 115-*e*, a change in a presence of higher priority data at the UE 115-*e*, etc.).

At 630, the UE 115-*e* may transmit the PUR request message. In some cases, the PUR request message may be transmitted using the uplink resources provided in an uplink grant associated with the connected-mode UE 115-*e*. In other cases, as will be discussed in more detail below, the UE 115-*e* may transmit the PUR request message using other uplink resources (e.g., SPS resources, in an EDT, other existing PUR resources, etc.).

At 635, the base station 105-*e* may receive the PUR request message and determine a PUR allocation for the UE 115-*e* is unavailable. In some cases, the base station 105-*e* may determine the PUR allocation is unavailable based on one or more of QOS information provided in the PUR request, whether AM or UM PUR are requested, other PUR allocations to other UEs, an amount of available PUR resources, or any combinations thereof.

At 640, the base station 105-*e* may transmit a PUR reject message to the UE 115-*e* that indicates the PUR request is rejected. In some cases, the UE 115-*e* may receive the PUR reject message and use another technique for uplink data transmission (e.g., SPS transmissions, EDT transmissions, UL grant requests based on BSR, and the like). In cases where the UE 115-*e* does not have an existing PUR allocation, the UE 115-*e* may simply determine that a PUR allocation is not available. In some cases, the UE 115-*e* may initiate a timer that indicates a time at which the UE 115-*e* may transmit another PUR request. In cases where the UE 115-*e* has an existing PUR allocation, in some cases the PUR reject message may indicate that the UE 115-*e* is to release the existing PUR allocation. In other cases, the UE may maintain the existing PUR allocation, and the PUR reject message may indicate that a reconfiguration of the existing PUR allocation is not to be performed. In some cases, the PUR reject message may provide an explicit or implicit indication of whether the existing PUR allocation is to be released or maintained. In other cases, the maintenance or release of the existing PUR configuration may be based on a default behavior, and in yet other cases, the PUR reject message may indicate a change to the default behavior.

FIG. 7 illustrates another example of a process flow 700 with a PUR reject message in accordance with aspects of the present disclosure. In some examples, process flow 700 may implement aspects of wireless communications system 100 or 200. In this example, process flow 700 includes UE 115-*f* and base station 105-*f*, which may be examples of the corresponding devices described with reference to FIGS. 1 and 2.

At 705, the UE 115-*f* may be in IDLE mode. In some cases, the UE 115-*f* may have previously performed a connection establishment and may be idle due to a lack of uplink or downlink data to be transmitted.

At 710, the base station 105-*f* may identify PUR resources and format a SIB that indicates PUR support. As discussed above, the SIB may provide information for various PUR parameters, such as an amount of data that may be transmitted in uplink transmissions using the PUR resources, a traffic or service priority associated with the PUR resources, etc. At 715, the base station **105-*f* may transmit, and the UE 115-*f*** may receive, the SIB with the indication of PUR support.

In this example, the UE **115-*f* may be in idle mode, and at 720 the UE 115-*f* may receive the SIB and identify base station 105-*f* supports PUR. In some cases, the UE 115-*d* may receive the SIB and other downlink control transmissions from the base station 105-*f* in periodic scheduled downlink control channel transmissions that are monitored by the idle-mode UE 115-*f***.

At 725, the UE **115-*f* may identify uplink data for PUR and format a PUR request message. The PUR request message may request a new configuration of PUR resources, for example. In some cases, the UE 115-*f* may have an existing PUR allocation and the PUR request may be for a reconfiguration of the existing PUR allocation (e.g., based on updated data traffic at the UE 115-*f*, a change in a presence of higher priority data at the UE 115-*f***, etc.).

At 730, the UE **115-*f* may transmit the PUR request message. In some cases, the PUR request message may be transmitted using, for example, SPS resources that were previously allocated to the UE 115-*f*. In other cases, the UE 115-*f* may perform a random access procedure and transmit the PUR request upon completion of the random access procedure (e.g., in a MSG5 transmission). In still other cases, the UE 115-*f*** may have an existing PUR allocation, and may transmit the PUR request using the existing PUR allocation.

At 735, the base station **105-*f* may receive the PUR request message and determine a PUR allocation for the UE 115-*f* is unavailable. In some cases, the base station 105-*f*** may determine the PUR allocation is unavailable based on one or more of QOS information provided in the PUR request, whether AM or UM PUR are requested, other PUR allocations to other UEs, an amount of available PUR resources, or any combinations thereof.

At 740, the base station **105-*f* may transmit a PUR reject message to the UE 115-*f* that indicates the PUR request is rejected. In some cases, the UE 115-*f* may receive the PUR reject message and use another technique for uplink data transmission (e.g., SPS transmissions, EDT transmissions, UL grant requests based on BSR, and the like). In cases where the UE 115-*f* does not have an existing PUR allocation, the UE 115-*f* may simply determine that a PUR allocation is not available. In some cases, the UE 115-*f* may initiate a timer that indicates a time at which the UE 115-*f* may transmit another PUR request. In cases where the UE 115-*f* has an existing PUR allocation, in some cases the PUR reject message may indicate that the UE 115-*f*** is to release the existing PUR allocation. In other cases, the UE may maintain the existing PUR allocation, and the PUR reject message may indicate that a reconfiguration of the existing PUR allocation is not to be performed. In some cases, the PUR reject message may provide an explicit or implicit indication of whether the existing PUR allocation is to be released or maintained. In other cases, the maintenance or release of the existing PUR configuration may be based on a default behavior, and in yet other cases, the PUR reject message may indicate a change to the default behavior.

FIG. 8 illustrates another example of a process flow 800 with a PUR reject message in accordance with aspects of the present disclosure. In some examples, process flow 800 may implement aspects of wireless communications system 100 or 200. In this example, process flow 800 includes UE **115-*g* and base station 105-*g*, which may be examples of corresponding devices described with reference to FIGS. 1 and 2**.

At 805, the UE **115-*g* may be in IDLE mode. In some cases, the UE 115-*g*** may have previously performed a connection establishment and may be idle due to a lack of uplink or downlink data to be transmitted.

At 810, the base station **105-*g* may identify EDT support and PUR resources, and format a SIB that indicates EDT and PUR support. In some cases, the base station may use separate SIBs to indicate PUR and EDT support. As discussed above, the SIB may provide information for various PUR parameters, such as an amount of data that may be transmitted in uplink transmissions using the PUR resources, a traffic or service priority associated with the PUR resources, etc. At 815, the base station 105-*g* may transmit, and the UE 115-*g*** may receive, the SIB(s) with the indication of PUR and EDT support.

In this example, the UE **115-*g* may be in idle mode, and at 820 the UE 115-*g* may receive the SIB and identify base station 105-*g* supports EDT and PUR. In some cases, the UE 115-*d* may receive the SIB and other downlink control transmissions from the base station 105-*g* in scheduled downlink control channel transmissions that are monitored by the idle-mode UE 115-*g***.

At 825, the UE **115-*g* may identify uplink data for PUR, format a PUR request message, and initiate the EDT technique. The PUR request message may request a new configuration of PUR resources, for example. In some cases, the UE 115-*g* may have an existing PUR allocation and the PUR request may be for a reconfiguration of the existing PUR allocation (e.g., based on updated data traffic at the UE 115-*g*, a change in a presence of higher priority data at the UE 115-*g***, etc.).

At 830, the UE **115-*g* may transmit the PUR request message using EDT. In some cases, the UE 115-*g*** may transmit a random access request and provide the PUR request in an EDT associated with the random access procedure, in accordance with established techniques for transmitting EDT.

At 835, the base station **105-*g* may receive the PUR request message and determine a PUR allocation for the UE 115-*g* is unavailable. In some cases, the base station 105-*g*** may determine the PUR allocation is unavailable based on one or more of QOS information provided in the PUR request, whether AM or UM PUR are requested, other PUR allocations to other UEs, an amount of available PUR resources, or any combinations thereof.

At 840, the base station **105-*g* may transmit a PUR reject message to the UE 115-*g* that indicates the PUR request is rejected. In some cases, the UE 115-*g* may receive the PUR reject message and use another technique for uplink data transmission (e.g., SPS transmissions, EDT transmissions, UL grant requests based on BSR, and the like). In cases where the UE 115-*g* does not have an existing PUR allocation, the UE 115-*g* may simply determine that a PUR allocation is not available. In some cases, the UE 115-*g* may initiate a timer that indicates a time at which the UE 115-*g* may transmit another PUR request. In cases where the UE 115-*g* has an existing PUR allocation, in some cases the PUR reject message may indicate that the UE 115-*g*** is to release the existing PUR allocation. In other cases, the UE may maintain the existing PUR allocation, and the PUR reject message may indicate that a reconfiguration of the existing PUR allocation is not to be performed. In some cases, the PUR reject message may provide an explicit or implicit indication of whether the existing PUR allocation is to be released or maintained. In other cases, the maintenance of release of the existing PUR configuration may be based on a default behavior, and in yet another cases, the PUR reject message may indicate a change to the default behavior.

Figure 9:
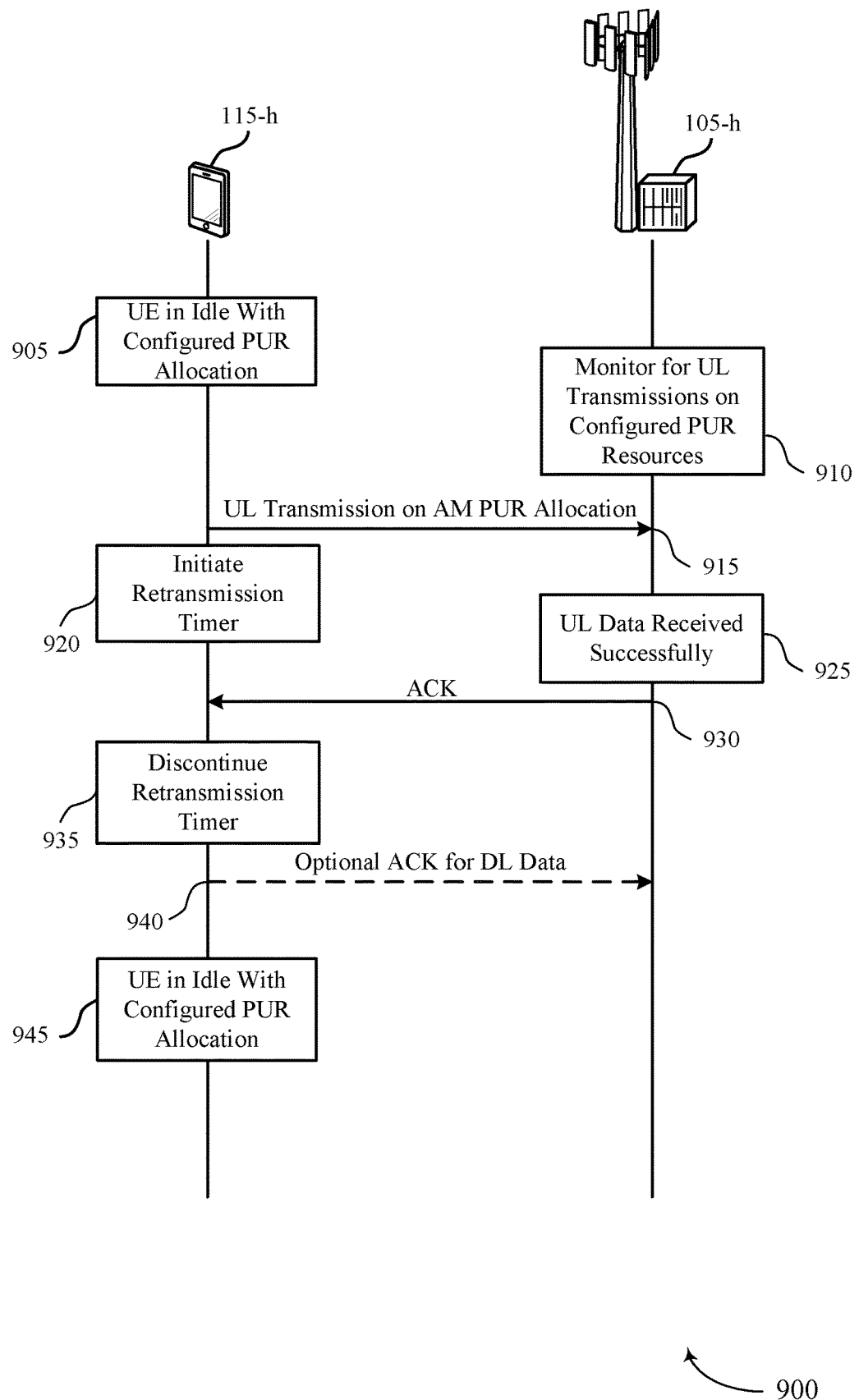

FIG. 9 illustrates an example of a process flow 900 that supports PUR techniques in wireless communications in accordance with aspects of the present disclosure. In some examples, process flow 900 may implement aspects of wireless communications system 100 or 200. In this example, process flow 900 includes UE 115-*h* and base station 105-*h*, which may be examples of the corresponding devices described with reference to FIGS. 1 through 8.

At 905, the UE 115-*h* may be in IDLE mode with a configured PUR allocation. In some cases, the UE 115-*h* may have previously performed a connection establishment and PUR request, and may be idle due to a lack of uplink or downlink data to be transmitted. In this example, the PUR allocation may be for AM uplink transmissions.

At 910, the base station 105-*h* may monitor for uplink transmissions via configured PUR resources. In some cases, the PUR resources may be periodic resources that are configured for uplink transmissions, and the base station 105-*h* may monitor these resources for uplink transmissions from the UE 115-*h*, and one or more other UE that may be served by the base station 105-*h* and that have also been provided with PUR allocations in the PUR resources.

At 915, the idle mode UE 115-*h* may transmit an uplink transmission using the AM PUR allocation. In some cases, the uplink transmission may provide uplink data associated with the UE 115-*h*, such as a measurement or sensor data that is to be reported by the UE 115-*h*. In some cases, the AM PUR allocation may be configured based on the PUR configuration at the base station 105-*h* and the PUR request of the UE 115-*h*, as discussed above.

At 920, the UE 115-*h* may initiate a retransmission timer, and may monitor for an acknowledgment from the base station 105-*h*. In some cases, the retransmission timer may be initiated upon completion of the uplink transmission on PUR. In some cases, the retransmission timer may be initiated upon beginning of the uplink transmission on PUR. A duration of the retransmission timer may be configured as part of the PUR configuration, or may be a predetermined duration, or the duration may correspond to one or more other retransmission timers of the UE 115-*h*.

At 925, the base station 105-*h* may receive the uplink transmission from the UE 115-*h*. The base station 105-*h* may receive the uplink transmission and decode the transmission, and verify that the uplink data is decoded successfully, for example. At 930, based on the successful receipt and decoding of the uplink transmission, the base station 105-*h* may transmit an acknowledgment to the UE 115-*h*. In some cases, the acknowledgement may be a L2/L3 acknowledgement as described with respect to FIG. 2, a L1 HARQ acknowledgement, or combination thereof.

At 935, the UE 115-*h* may receive the acknowledgment from the base station 105-*h*, and may discontinue the retransmission timer. At 940, the UE 115-*h* may optionally transmit an acknowledgment for downlink data to the base station 105-*h*. At 945, the UE 115-*h* may move to idle mode with the configured PUR allocation.

Figure 10:
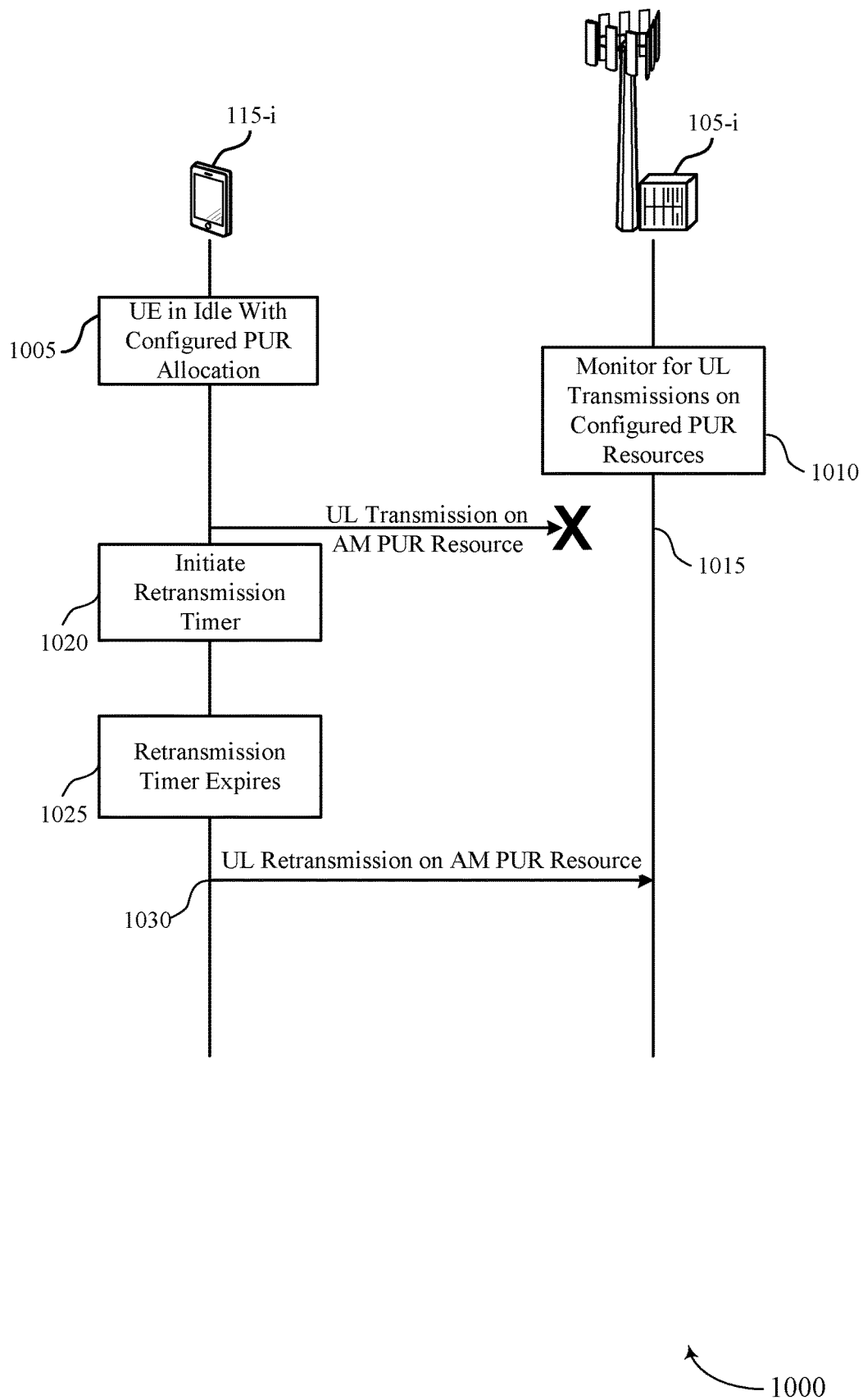

FIG. 10 illustrates an example of a process flow 1000 that supports PUR techniques in wireless communications in accordance with aspects of the present disclosure. In some examples, process flow 1000 may implement aspects of wireless communications system 100 or 200. In this example, process flow 1000 includes UE 115-*i* and base station 105-*i*, which may be examples of the corresponding devices described with reference to FIGS. 1 through 8.

At 1005, the UE 115-*i* may be in IDLE mode with a configured PUR allocation. In some cases, the UE 115-*i* may have previously performed a connection establishment and PUR request, and may be idle due to a lack of uplink or downlink data to be transmitted. In this example, the PUR allocation may be for AM uplink transmissions.

At 1010, the base station 105-*i* may monitor for uplink transmissions via configured PUR resources. In some cases, the PUR resources may be periodic resources that are configured for uplink transmissions, and the base station 105-*i* may monitor these resources for uplink transmissions from the UE 115-*i*, and one or more other UE that may be served by the base station 105-*i* and that have also been provided with PUR allocations in the PUR resources.

At 1015, the idle mode UE 115-*i* may transmit an uplink transmission using the AM PUR allocation. In this example, the uplink transmission is not received at the base station base station 105-*i* (e.g., due to interference that prevents successful reception and decoding of the uplink transmission at the base station 105-*i*).

At 1020, the UE 115-*i* may initiate a retransmission timer, and may monitor for an acknowledgment from the base station 105-*i*. In some cases, the retransmission timer may be initiated upon completion of the uplink transmission. In some cases, the retransmission timer may be initiated upon beginning of the uplink transmission. A duration of the retransmission timer may be configured as part of the PUR configuration, or may be a predetermined duration, or the duration may correspond to one or more other retransmission timers of the UE 115-*i*.

At 1025, the retransmission timer at the UE 115-*i* expires. The UE 115-*i*, based on not receiving an acknowledgment from the base station 105-*i*, may determine to retransmit the uplink transmission.

At 1030, the UE 115-*i* may retransmit the uplink transmission using the AM PUR resources. Following the retransmission, the UE 115-*i* may again initiate the retransmission timer and perform operations related to monitoring for acknowledgment from the base station 105-*i* again. In some cases, is a number of retransmissions exceeds a threshold value, the UE 115-*i* may fallback to other techniques to transmit the uplink transmission to the base station 105-*i*.

Figure 11:
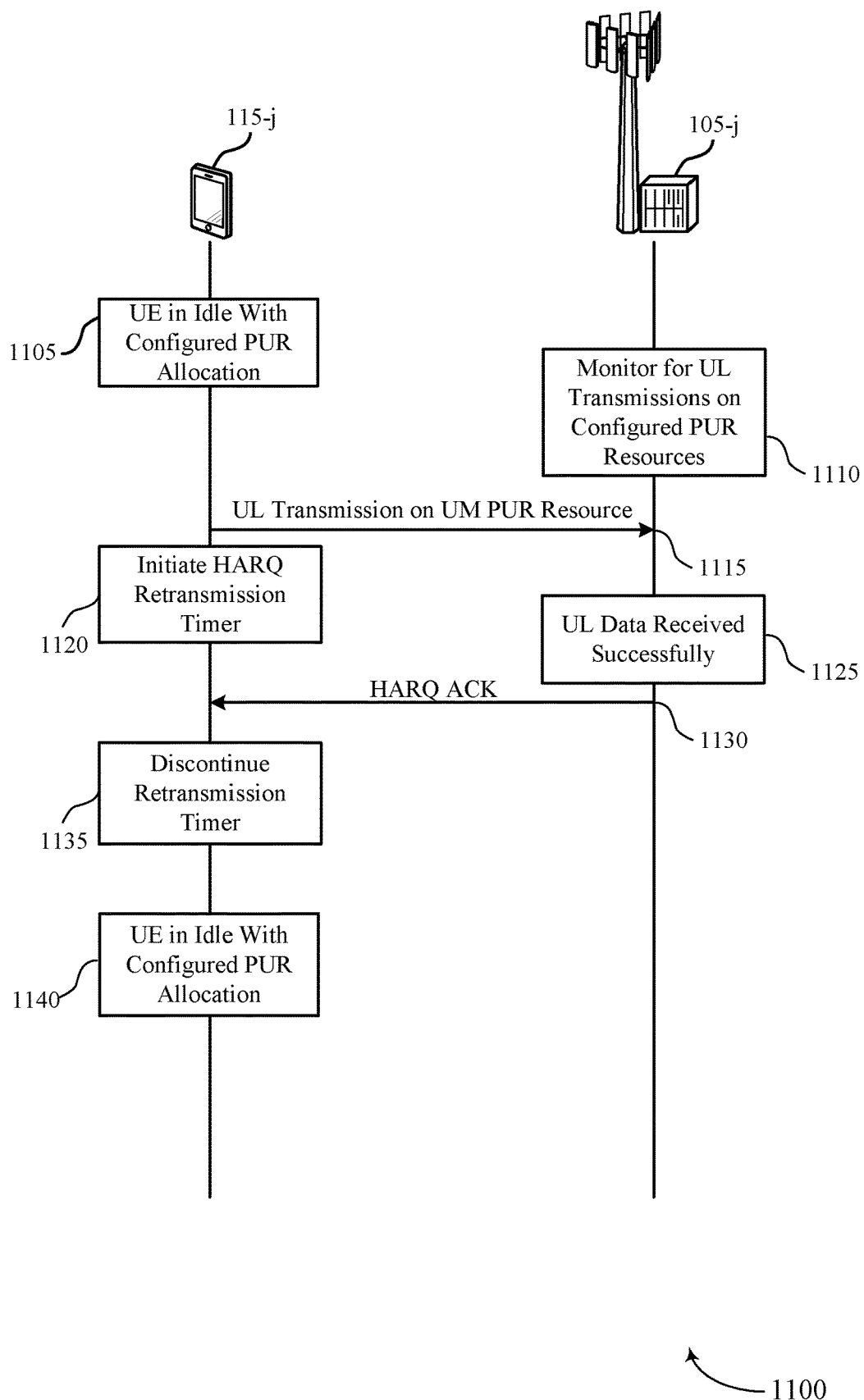

FIG. 11 illustrates an example of a process flow 1100 that supports PUR techniques in wireless communications in accordance with aspects of the present disclosure. In some examples, process flow 1100 may implement aspects of wireless communications system 100 or 200. In this example, process flow 1100 includes UE 115-*j* and base station 105-*j*, which may be examples of the corresponding devices described with reference to FIGS. 1 through 8.

At 1105, the UE 115-*j* may be in IDLE mode with a configured PUR allocation. In some cases, the UE 115-*j* may have previously performed a connection establishment and PUR request, and may be idle due to a lack of uplink or downlink data to be transmitted. In this example, the PUR allocation may be for UM uplink transmissions.

At 1110, the base station 105-*j* may monitor for uplink transmissions via configured PUR resources. In some cases, the PUR resources may be periodic resources that are configured for uplink transmissions, and the base station 105-*j* may monitor these resources for uplink transmissions from the UE 115-*j*, and one or more other UE that may be served by the base station 105-*j* and that have also been provided with PUR allocations in the PUR resources.

At 1115, the idle mode UE 115-*j* may transmit an uplink transmission using the UM PUR allocation. In some cases, the uplink transmission may provide uplink data associated with the UE 115-j, such as a measurement or sensor data that is to be reported by the UE 115-j. In some cases, the UM PUR allocation may be configured based on the PUR configuration at the base station 105-j and the PUR request of the UE 115-j, as discussed above, and the base station 105-j may provide L1 HARQ acknowledgments for UM PUR transmissions.

At 1120, the UE 115-j may initiate a HARQ retransmission timer, and may monitor for a HARQ acknowledgment from the base station 105-j. In some cases, the HARQ retransmission timer may be initiated upon completion of the uplink transmission.

At 1125, the base station 105-j may receive the uplink transmission from the UE 115-j. The base station 105-j may receive the uplink transmission and decode the transmission, and verify that the uplink data is decoded successfully, for example. At 1110, based on the successful receipt and decoding of the uplink transmission, the base station 105-j may transmit a HARQ acknowledgment to the UE 115-j.

At 1135, the UE 115-j may receive the HARQ acknowledgment from the base station 105-j, and may discontinue the HARQ retransmission timer. At 1140, the UE 115-j move to idle mode with the configured PUR allocation.

Figure 12:
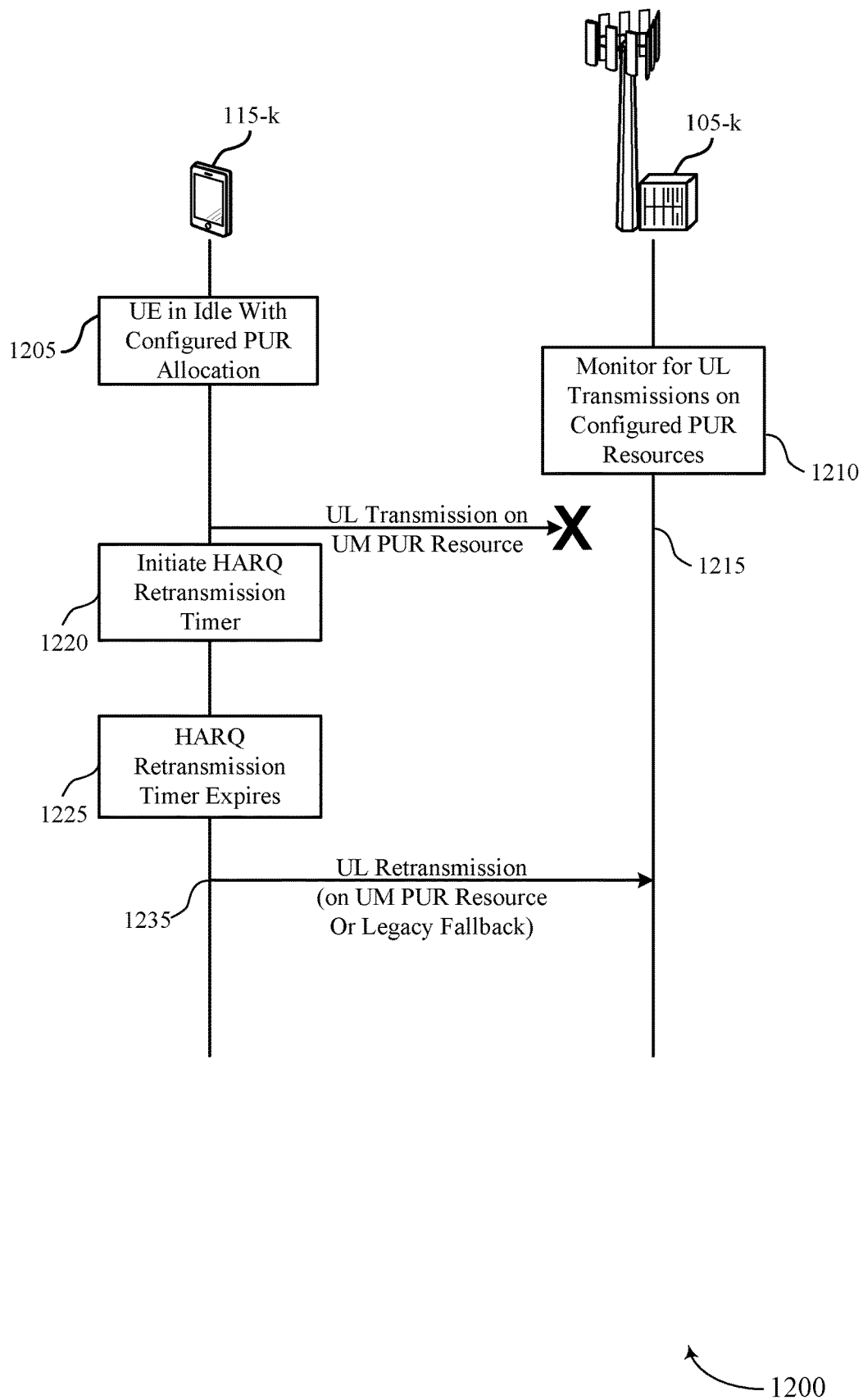

FIG. 12 illustrates an example of a process flow 1200 that supports PUR techniques in wireless communications in accordance with aspects of the present disclosure. In some examples, process flow 1200 may implement aspects of wireless communications system 100 or 200. In this example, process flow 1200 includes UE 115-k and base station 105-k, which may be examples of the corresponding devices described with reference to FIGS. 1 through 8.

At 1205, the UE 115-k may be in IDLE mode with a configured PUR allocation. In some cases, the UE 115-k may have previously performed a connection establishment and PUR request, and may be idle due to a lack of uplink or downlink data to be transmitted. In this example, the PUR allocation may be for UM uplink transmissions.

At 1210, the base station 105-k may monitor for uplink transmissions via configured PUR resources. In some cases, the PUR resources may be periodic resources that are configured for uplink transmissions, and the base station 105-k may monitor these resources for uplink transmissions from the UE 115-k, and one or more other UE that may be served by the base station 105-k and that have also been provided with PUR allocations in the PUR resources.

At 1215, the idle mode UE 115-k may transmit an uplink transmission using the UM PUR allocation. In this example, the uplink transmission is not received at the base station base station 105-k (e.g., due to interference that prevents successful reception and decoding of the uplink transmission at the base station 105-k).

At 1220, the UE 115-k may initiate a HARQ retransmission timer, and may monitor for a HARQ acknowledgment from the base station 105-k. In some cases, the HARQ retransmission timer may be initiated upon completion of the uplink transmission using PUR.

At 1225, the HARQ retransmission timer at the UE 115-k expires. The UE 115-k, based on not receiving a HARQ acknowledgment from the base station 105-k, may determine to retransmit the uplink transmission.

At 1230, the UE 115-k may retransmit the uplink transmission using the UM PUR resources. Following the retransmission, the UE 115-k may again initiate the HARQ retransmission timer and perform operations related to monitoring for acknowledgment from the base station 105-k again. In some cases, is a number of retransmissions exceeds a threshold value, the UE 115-k may fallback to other techniques to transmit the uplink transmission to the base station.

Figure 13:
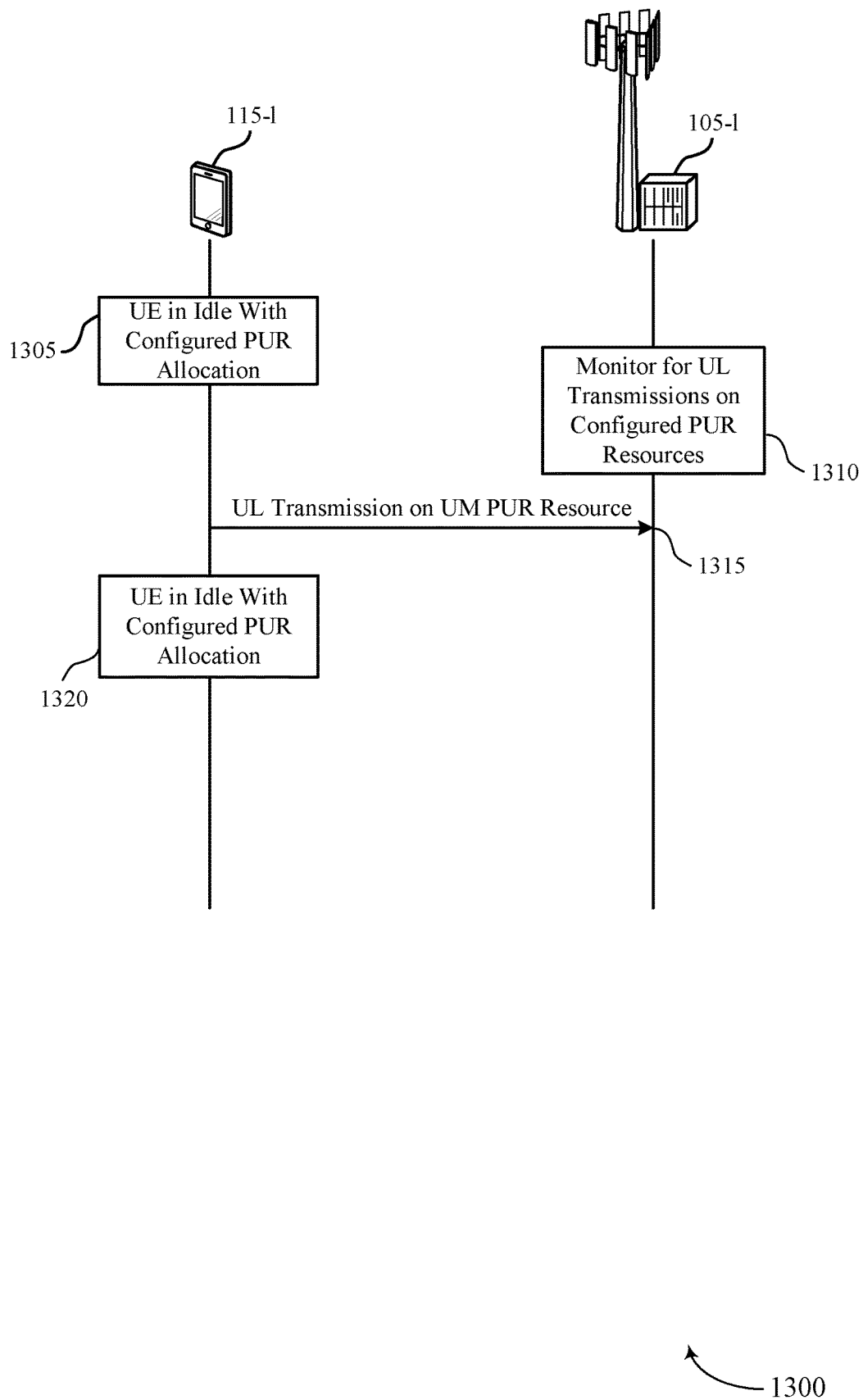

FIG. 13 illustrates an example of a process flow 1300 that supports PUR techniques in wireless communications in accordance with aspects of the present disclosure. In some examples, process flow 1300 may implement aspects of wireless communications system 100 or 200. In this example, process flow 1300 includes UE 115-l and base station 105-l, which may be examples of the corresponding devices described with reference to FIGS. 1 through 8.

At 1305, the UE 115-l may be in IDLE mode with a configured PUR allocation. In some cases, the UE 115-l may have previously performed a connection establishment and PUR request, and may be idle due to a lack of uplink or downlink data to be transmitted. In this example, the PUR allocation may be for UM uplink transmissions.

At 1310, the base station 105-l may monitor for uplink transmissions via configured PUR resources. In some cases, the PUR resources may be periodic resources that are configured for uplink transmissions, and the base station 105-l may monitor these resources for uplink transmissions from the UE 115-l, and one or more other UE that may be served by the base station 105-l and that have also been provided with PUR allocations in the PUR resources.

At 1315, the idle mode UE 115-l may transmit an uplink transmission using the UM PUR allocation. In this example, acknowledgment of the uplink transmission is not configured, and the uplink transmission is simply transmitted without further action (i.e., "fire-and-forget"). In some cases, such unacknowledged transmissions may be associated with relatively non-critical data, such as sensor data of the UE 115-l that is transmitted at relatively frequent intervals, such that missing one or two transmissions does not impact operations associated with the UE 115-l or the base station 105-l. At 1320, the UE 115-l may move to idle mode with the configured UM PUR allocation.

Figure 14:
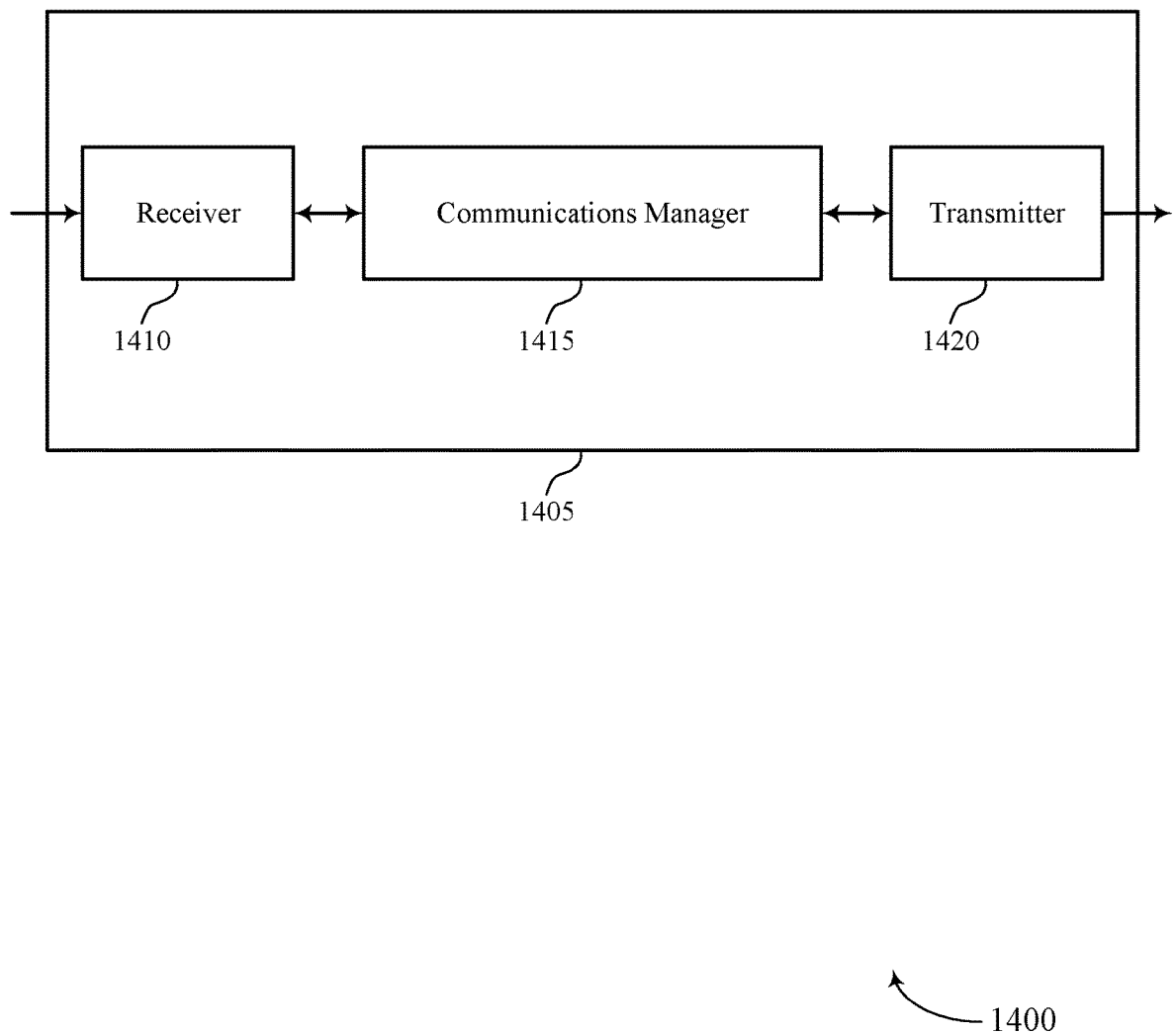
FIGS. 14 and 15 show block diagrams of devices that support PUR techniques in wireless communications in accordance with aspects of the present disclosure.

FIG. 14 shows a block diagram 1400 of a device 1405 that supports PUR techniques in wireless communications in accordance with aspects of the present disclosure. The device 1405 may be an example of aspects of a UE 115 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to PUR techniques in wireless communications, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may determine that a base station supports PUR for uplink transmissions from the UE using PUR, transmit a PUR request message to the base station based on the determining that the base station supports PUR, where the PUR request message indicates whether layer one HARQ acknowledgment of PUR transmissions is requested, receive a PUR configuration from the base station (e.g., responsive to the PUR request message) that identifies PUR allocated to the UE, and transmit one or more uplink data transmissions to the base station using the PUR allocated to the UE. The communications manager

1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
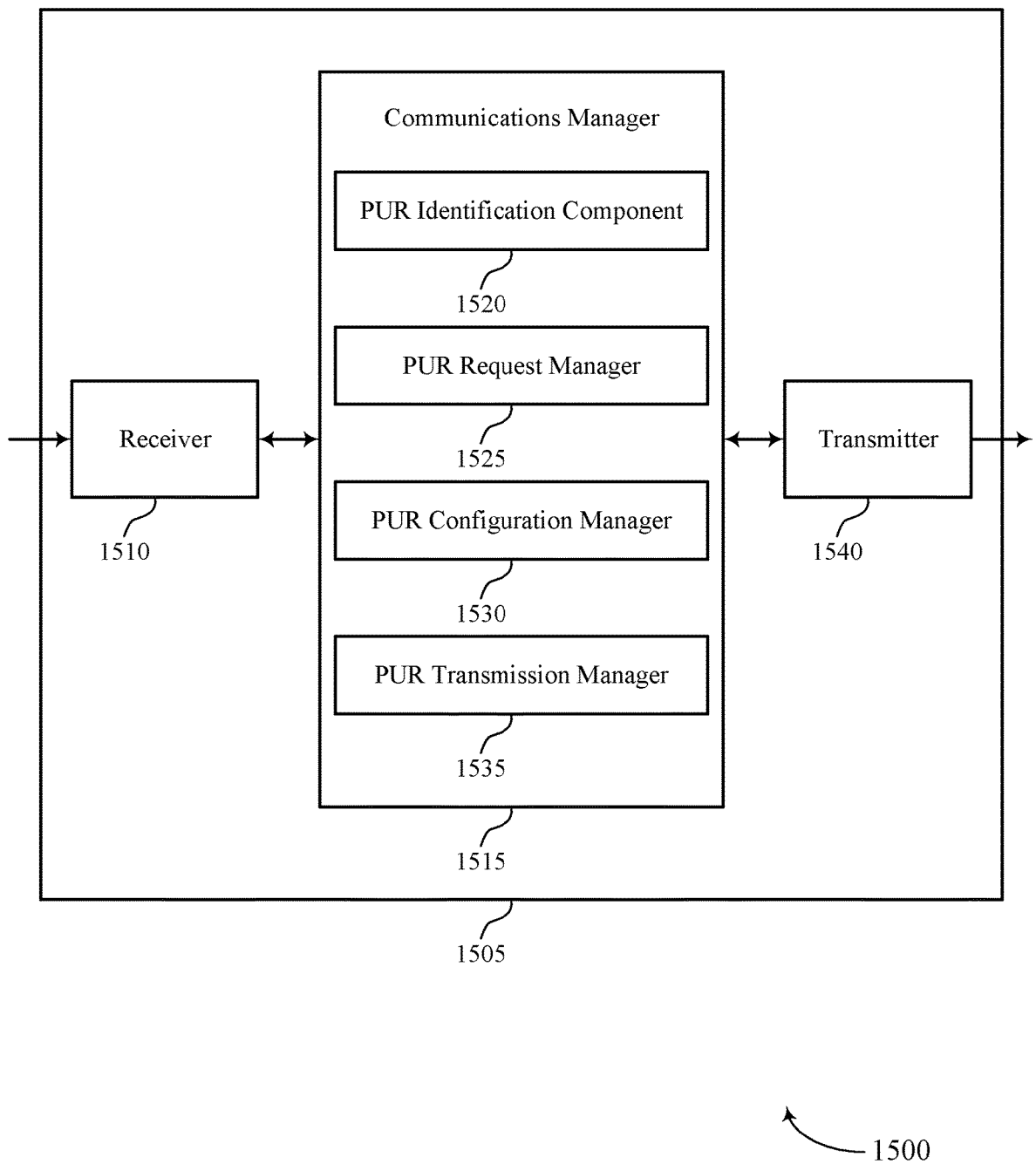

FIG. 15 shows a block diagram 1500 of a device 1505 that supports PUR techniques in wireless communications in accordance with aspects of the present disclosure. The device 1505 may be an example of aspects of a device 1405, or a UE 115 as described herein. The device 1505 may include a receiver 1510, a communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to PUR techniques in wireless communications, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a PUR identification component 1520, a PUR request manager 1525, a PUR configuration manager 1530, and a PUR transmission manager 1535. The communications manager 1515 may be an example of aspects of the communications manager 1710 described herein.

The PUR identification component 1520 may determine that a base station supports PUR for uplink transmissions from the UE using PUR.

The PUR request manager 1525 may transmit a PUR request message to the base station based on the determining that the base station supports PUR, where the PUR request message indicates whether layer one HARQ acknowledgment of PUR transmissions is requested.

The PUR configuration manager 1530 may receive a PUR configuration from the base station that identifies PUR allocated to the UE.

The PUR transmission manager 1535 may transmit one or more uplink data transmissions to the base station using the PUR allocated to the UE.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
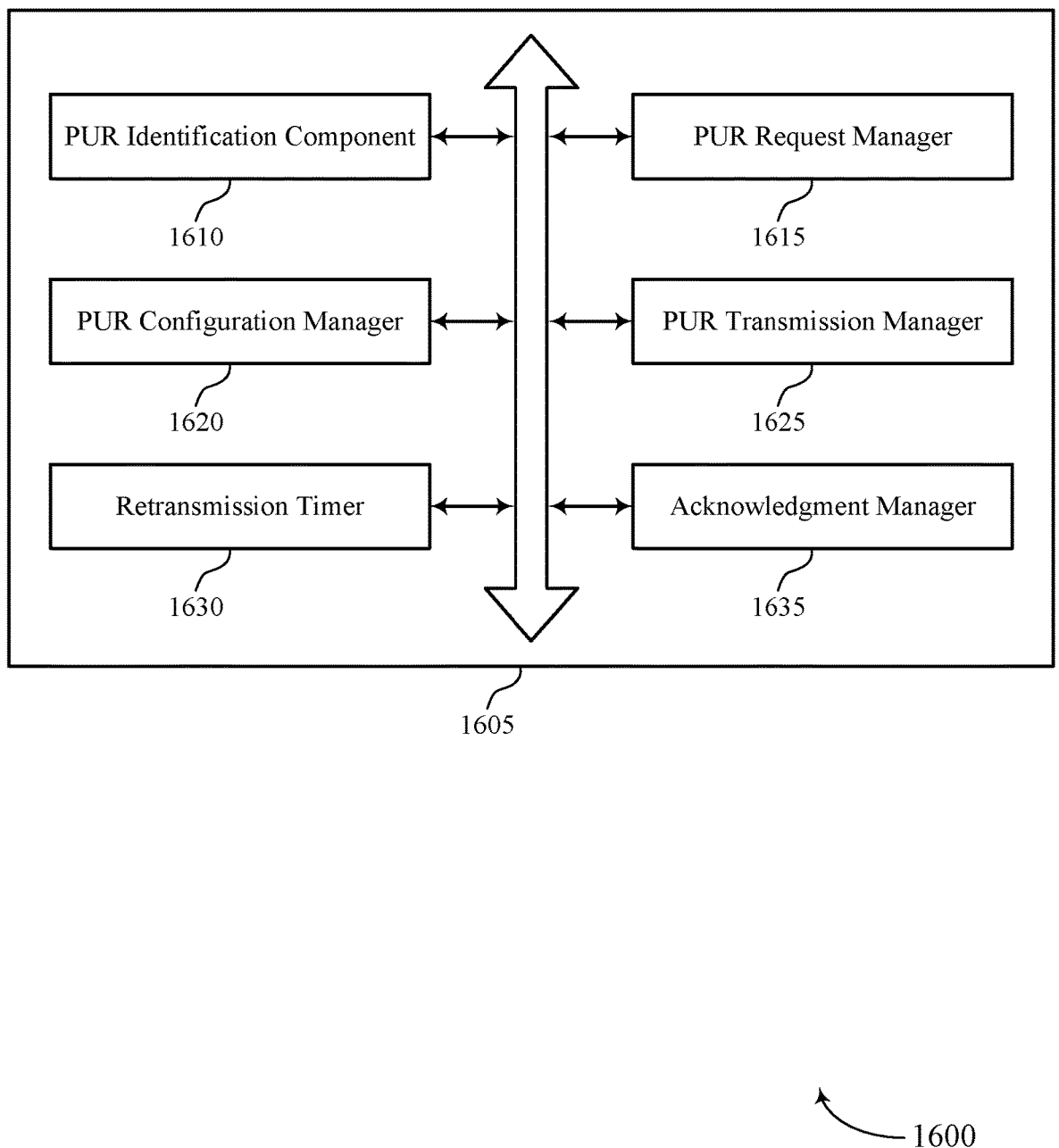
FIG. 16 shows a block diagram of a communications manager that supports PUR techniques in wireless communications in accordance with aspects of the present disclosure.

FIG. 16 shows a block diagram 1600 of a communications manager 1605 that supports PUR techniques in wireless communications in accordance with aspects of the present disclosure. The communications manager 1605 may be an example of aspects of a communications manager 1415, a communications manager 1515, or a communications manager 1710 described herein. The communications manager 1605 may include a PUR identification component 1610, a PUR request manager 1615, a PUR configuration manager 1620, a PUR transmission manager 1625, a retransmission timer 1630, and an acknowledgment manager 1635. Each of these modules may communicate, directly or indirectly, with one another (e.g., via one or more buses).

The PUR identification component 1610 may determine that a base station supports PUR for uplink transmissions from the UE using PUR. In some cases, the determining that the base station supports PUR for uplink transmissions includes receiving a SIB from the base station that indicates PUR support. In some cases, the SIB indicates one or more of AM PUR support, UM PUR support, or combinations thereof. In some cases, the SIB indicates AM PUR support for a first set of resources (e.g., a first time period or first frequency resources), and UM PUR support for a second set of resources (e.g., a second time period or second frequency resources), and where the PUR request message indicates an AM PUR request or a UM PUR request.

The PUR request manager 1615 may transmit a PUR request message to the base station based on the determining that the base station supports PUR. In some examples, the PUR request manager 1615 may identify data traffic at the UE to be transmitted using the PUR, and may determine a QOS associated with the data traffic. In some examples, the PUR request manager 1615 may format the PUR request message based on the data traffic and the QOS associated with the data traffic. In some cases, the determining the QOS includes determining to request acknowledged mode communications using the PUR based on the data traffic. In some cases, the determining the QOS includes determining to request unacknowledged mode communications using the PUR based on the data traffic. In some cases, the AM PUR request or the UM PUR request is an explicit request or an implicit request, and where the implicit request is based on a default mode of operation or an indicated capability of the base station.

In some cases, the transmitting the PUR request message to the base station is performed via uplink resources provided to the UE in one or more of an uplink grant, a SPS uplink grant, an EDT of a random access procedure, a different PUR resource, or any combinations thereof. In some cases, the PUR request message is a PUR reconfiguration message to reconfigure an existing PUR allocation of the UE.

The PUR configuration manager 1620 may receive a PUR configuration from the base station (e.g., responsive to the PUR request message) that identifies PUR allocated to the UE. In some examples, the PUR configuration manager 1620 may transmit, responsive to receiving the PUR configuration, a PUR configuration complete message to the base station.

In some cases, the PUR configuration provides an explicit indication of an AM PUR allocation or a UM PUR allocation to the UE, or an implicit indication of the AM PUR allocation or the UM PUR allocation to the UE, and where the implicit indication is based on one or more of a requested mode in the PUR request, a default mode of operation, an indicated capability of the base station, or any combinations thereof. In some cases, the UE has a prior PUR allocation prior to the transmitting the PUR request message, and the PUR request message requests a reconfiguration of the prior PUR allocation.

In some cases, the PUR configuration indicates the PUR request is rejected by the base station. In some cases, the UE, responsive to the rejected PUR request, performs one of releasing an existing PUR allocation, maintaining the prior PUR allocation, or requesting other uplink resources from the base station.

The PUR transmission manager 1625 may transmit one or more uplink data transmissions to the base station using the PUR allocated to the UE. In some cases, the UE is in an idle mode prior to transmitting the one or more uplink data transmissions and returns to the idle mode upon completion of the one or more uplink data transmissions. In some cases, the one or more uplink data transmissions from the UE are transmitted using a RRC PUR message.

The retransmission timer 1630 may initiate a retransmission timer responsive to transmitting a first uplink data transmission to the base station.

The acknowledgment manager 1635 may monitor, during a time period associated with the retransmission timer, for an acknowledgment from the base station that indicates the first uplink data transmission was received at the base station. In some examples, the acknowledgment manager 1635 may retransmit the first uplink data transmission responsive to the retransmission timer expiring prior to receiving the acknowledgment from the base station. In some examples, the acknowledgment manager 1635 may receive the acknowledgment from the base station and may discontinue the retransmission timer. In some cases, the acknowledgment from the base station is a layer one HARQ acknowledgment, a layer two acknowledgment, or layer three acknowledgment from the base station provided via one or more of a MAC-CE, a RLC status report, a PDCP status report, a RRC message, or any combinations thereof.

Figure 17:
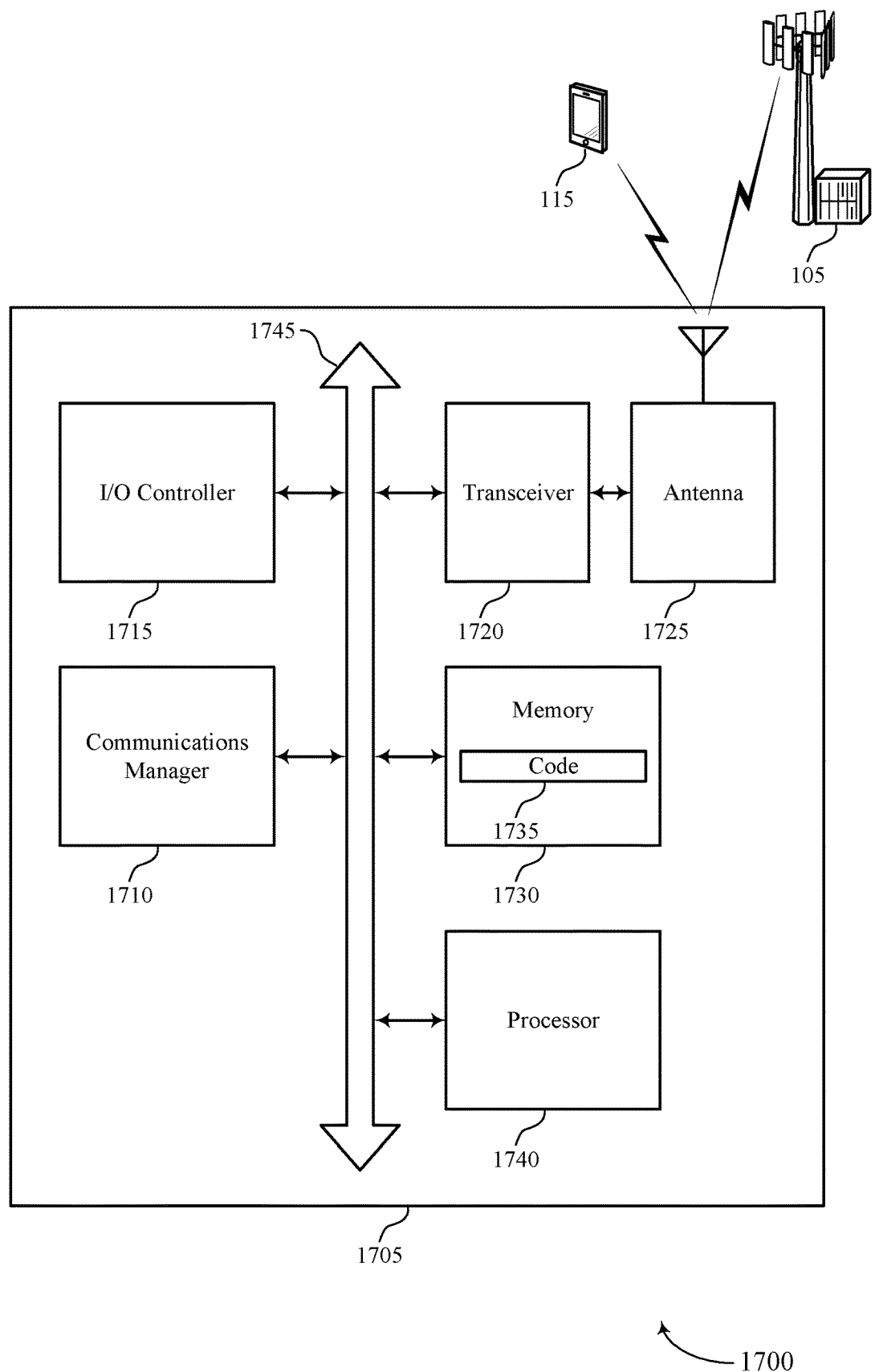
FIG. 17 shows a diagram of a system including a device that supports PUR techniques in wireless communications in accordance with aspects of the present disclosure.

FIG. 17 shows a diagram of a system 1700 including a device 1705 that supports PUR techniques in wireless communications in accordance with aspects of the present disclosure. The device 1705 may be an example of or include the components of device 1405, device 1505, or a UE 115 as described herein. The device 1705 may include components for bi-directional voice and data communications including components for transmitting and receiving communications, including a communications manager 1710, an I/O controller 1715, a transceiver 1720, an antenna 1725, memory 1730, and a processor 1740. These components may be in electronic communication via one or more buses (e.g., bus 1745).

The communications manager 1710 may determine that a base station supports PUR for uplink transmissions from the UE using PUR, transmit a PUR request message to the base station based on the determining that the base station supports PUR, where the PUR request message indicates whether layer one HARQ acknowledgment of PUR transmissions is requested, receive a PUR configuration from the base station responsive to the PUR request message that identifies PUR allocated to the UE, and transmit one or more uplink data transmissions to the base station using the PUR allocated to the UE.

The I/O controller 1715 may manage input and output signals for the device 1705. The I/O controller 1715 may also manage peripherals not integrated into the device 1705. In some cases, the I/O controller 1715 may represent a physical connection or port to an external peripheral. In some cases, the I/O controller 1715 may utilize an operating system such as iOS®, ANDROID®, MS-DOS®, MS-WINDOWS®, OS/2®, UNIX®, LINUX®, or another known operating system. In other cases, the I/O controller 1715 may represent or interact with a modem, a keyboard, a mouse, a touchscreen, or a similar device. In some cases, the I/O controller 1715 may be implemented as part of a processor. In some cases, a user may interact with the device 1705 via the I/O controller 1715 or via hardware components controlled by the I/O controller 1715.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM and ROM. The memory 1730 may store computer-readable, computer-executable code 1735 including instructions that, when executed, cause the processor to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting PUR techniques in wireless communications).

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
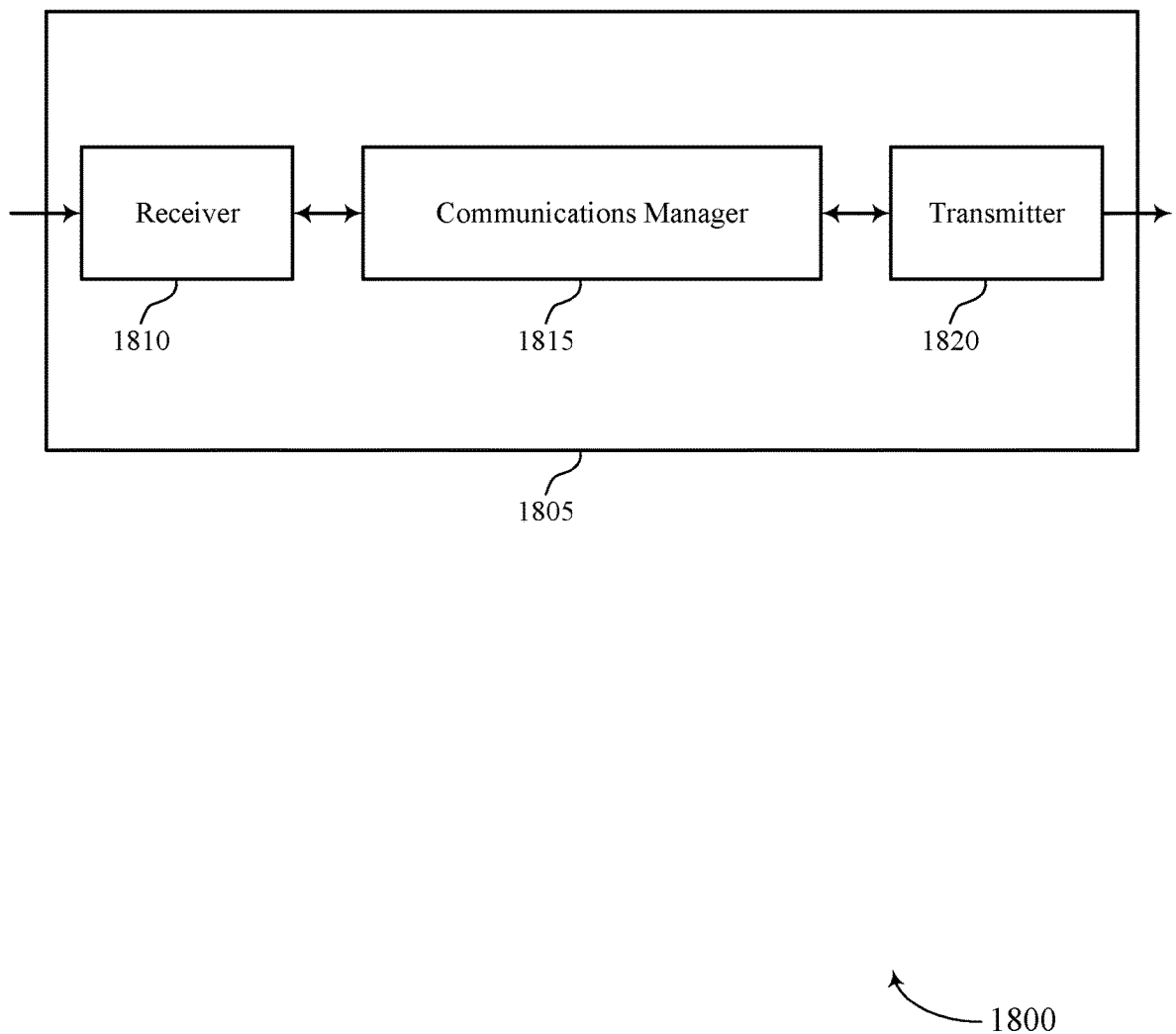
FIGS. 18 and 19 show block diagrams of devices that support PUR techniques in wireless communications in accordance with aspects of the present disclosure.

FIG. 18 shows a block diagram 1800 of a device 1805 that supports PUR techniques in wireless communications in accordance with aspects of the present disclosure. The device 1805 may be an example of aspects of a base station 105 as described herein. The device 1805 may include a receiver 1810, a communications manager 1815, and a transmitter 1820. The device 1805 may also include a processor. Each of these components may be in communication with one another (e.g., via one or more buses).

The receiver 1810 may receive information such as packets, user data, or control information associated with various information channels (e.g., control channels, data channels, and information related to PUR techniques in wireless communications, etc.). Information may be passed on to other components of the device 1805. The receiver 1810 may be an example of aspects of the transceiver 2120 described with reference to FIG. 21. The receiver 1810 may utilize a single antenna or a set of antennas.

The communications manager 1815 may identify a set of PUR for uplink transmissions from a UE to the base station, transmit an indication of the set of PUR to one or more UEs, receive a PUR request message from a first UE, where the PUR request message indicates whether layer one HARQ acknowledgment of PUR transmissions is requested, determine, responsive to the PUR request message, a PUR configuration for the first UE that identifies a PUR allocation for the first UE, and transmit the PUR configuration to the first UE. The communications manager 1815 may be an example of aspects of the communications manager 2110 described herein.

The communications manager 1815, or its sub-components, may be implemented in hardware, code (e.g., software or firmware) executed by a processor, or any combination thereof. If implemented in code executed by a processor, the functions of the communications manager 1815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1815, or its sub-components, may be physically located at various positions, including being distributed such that portions of functions are implemented at different physical locations by one or more physical components. In some examples, the communications manager 1815, or its sub-components, may be a separate and distinct component in accordance with various aspects of the present disclosure. In some examples, the communications manager 1815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1820 may transmit signals generated by other components of the device 1805. In some examples, the transmitter 1820 may be collocated with a receiver 1810 in a transceiver module. For example, the transmitter 1820 may be an example of aspects of the transceiver 2120 described with reference to FIG. 21. The transmitter 1820 may utilize a single antenna or a set of antennas.

Figure 19:
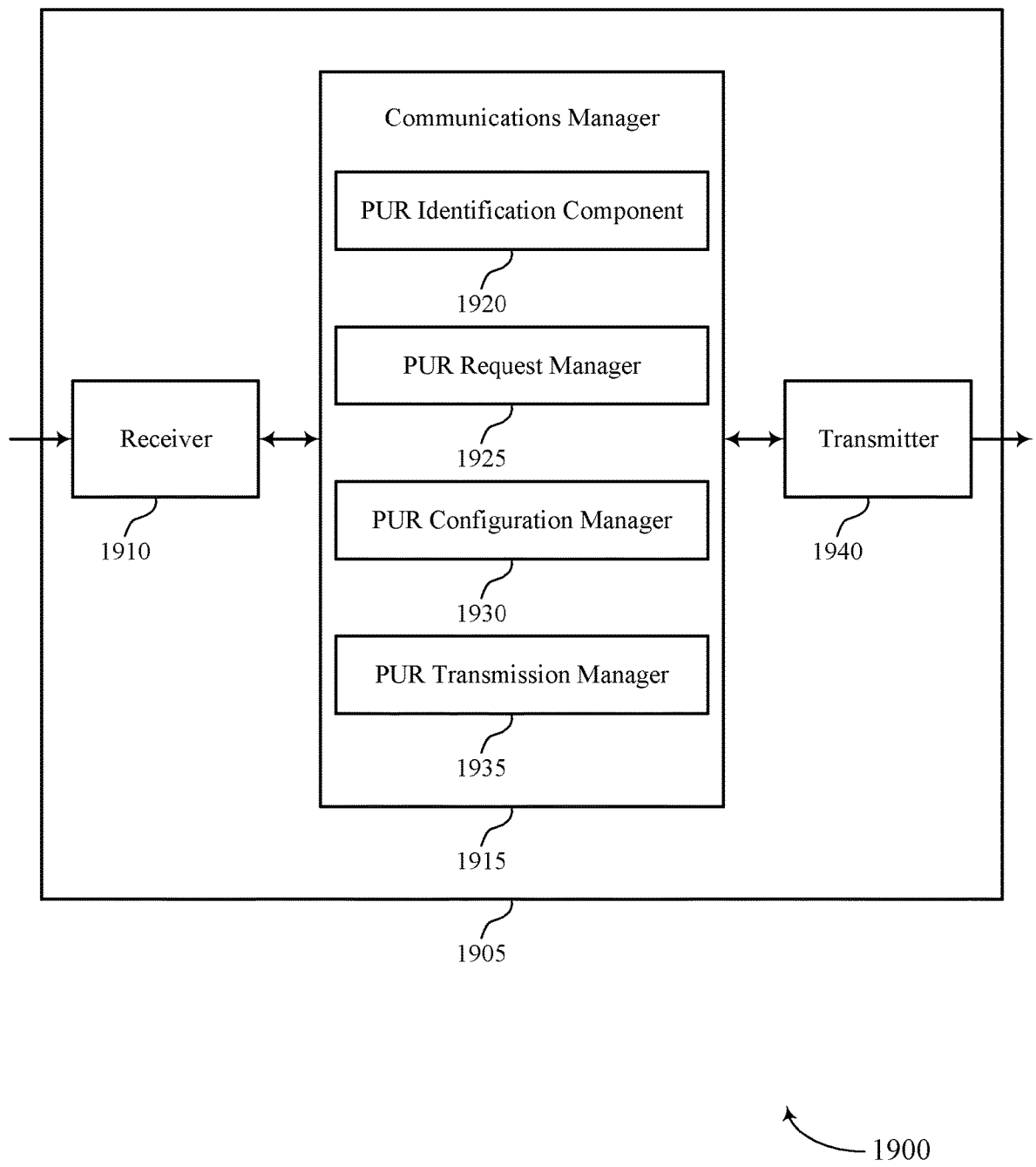

FIG. 19 shows a block diagram 1900 of a device 1905 that supports PUR techniques in wireless communications in accordance with aspects of the present disclosure. The device 1905 may be an example of aspects of a device 1805, or a base station 105 as described herein. The device 1905 may include a receiver 1910, a communications manager 1915, and a transmitter 1940. The device 1905 may also include a processor. Each of these components may be in communication with one another (e.g., via one or more buses).

The receiver 1910 may receive information such as packets, user data, or control information associated with various information channels (e.g., control channels, data channels, and information related to PUR techniques in wireless communications, etc.). Information may be passed on to other components of the device 1905. The receiver 1910 may be an example of aspects of the transceiver 2120 described with reference to FIG. 21. The receiver 1910 may utilize a single antenna or a set of antennas.

The communications manager 1915 may be an example of aspects of the communications manager 1815 as described herein. The communications manager 1915 may include a PUR identification component 1920, a PUR request manager 1925, a PUR configuration manager 1930, and a PUR transmission manager 1935. The communications manager 1915 may be an example of aspects of the communications manager 2110 described herein.

The PUR identification component 1920 may identify a set of PUR for uplink transmissions from a UE to the base station and transmit an indication of the set of PUR to one or more UEs.

The PUR request manager 1925 may receive a PUR request message from a first UE, where the PUR request message indicates whether layer one HARQ acknowledgment of PUR transmissions is requested.

The PUR configuration manager 1930 may determine (e.g., responsive to the PUR request message) a PUR configuration for the first UE that identifies a PUR allocation for the first UE.

The PUR transmission manager 1935 may transmit the PUR configuration to the first UE.

The transmitter 1940 may transmit signals generated by other components of the device 1905. In some examples, the transmitter 1940 may be collocated with a receiver 1910 in a transceiver module. For example, the transmitter 1940 may be an example of aspects of the transceiver 2120 described with reference to FIG. 21. The transmitter 1940 may utilize a single antenna or a set of antennas.

Figure 20:
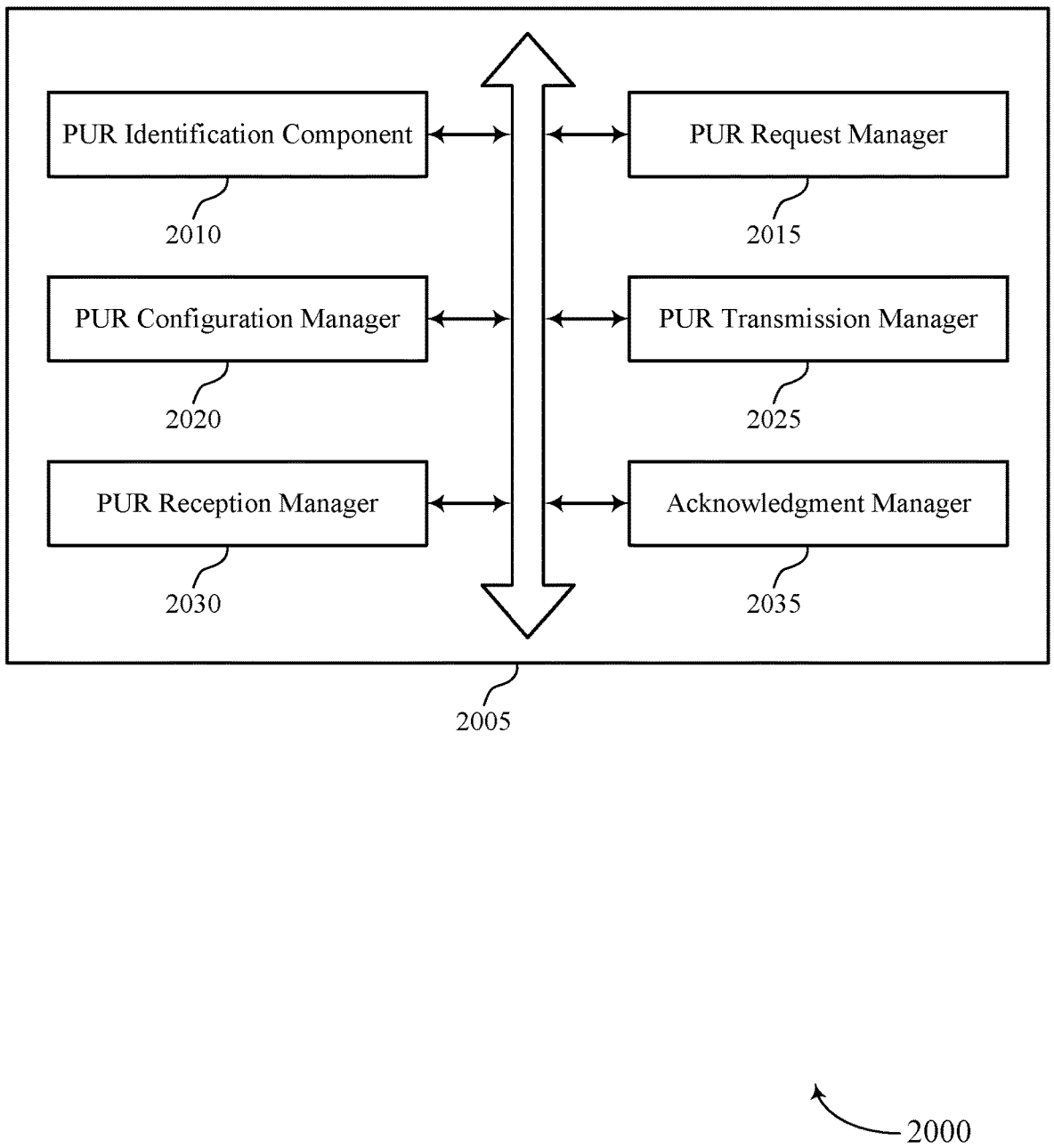
FIG. 20 shows a block diagram of a communications manager that supports PUR techniques in wireless communications in accordance with aspects of the present disclosure.

FIG. 20 shows a block diagram 2000 of a communications manager 2005 that supports PUR techniques in wireless communications in accordance with aspects of the present disclosure. The communications manager 2005 may be an example of aspects of a communications manager 1815, a communications manager 1915, or a communications manager 2110 described herein. The communications manager 2005 may include a PUR identification component 2010, a PUR request manager 2015, a PUR configuration manager 2020, a PUR transmission manager 2025, a PUR reception manager 2030, and an acknowledgment manager 2035. Each of these modules may communicate, directly or indirectly, with one another (e.g., via one or more buses).

The PUR identification component 2010 may identify a set of PUR for uplink transmissions from a UE to the base station. In some examples, the PUR identification component 2010 may transmit an indication of the set of PUR to one or more UEs. In some cases, the indication of the set of PUR is provided in a SIB. In some cases, the SIB indicates one or more of AM PUR support, UM PUR support, or combinations thereof.

The PUR request manager 2015 may receive a PUR request message from a first UE. In some cases, the PUR request message indicates a QOS associated with the first UE, and where the PUR configuration is determined based on the QOS associated with the first UE. In some cases, the QOS indicates that the UE is requesting acknowledged mode communications using the PUR. In some cases, the QOS indicates that the UE is requesting unacknowledged mode communications using the PUR. In some cases, the PUR request message is received from the first UE via uplink resources provided to the UE in one or more of an uplink grant, a SPS uplink grant, an EDT of a random access procedure, a different PUR resource, or any combinations thereof.

The PUR configuration manager 2020 may determine a PUR configuration for the first UE that identifies a PUR allocation for the first UE. The PUR transmission manager 2025 may transmit the PUR configuration to the first UE. The PUR reception manager 2030 may receive a first uplink data transmission using the PUR allocation for the first UE.

The acknowledgment manager 2035 may transmit an acknowledgment to the first UE that indicates the first uplink data transmission was received at the base station. In some cases, the acknowledgment is a layer one HARQ acknowledgment, a layer two acknowledgment, or layer three acknowledgment transmitted to the UE via one or more of a MAC-CE, a RLC status report, a PDCP status report, a RRC message, or any combinations thereof.

Figure 21:
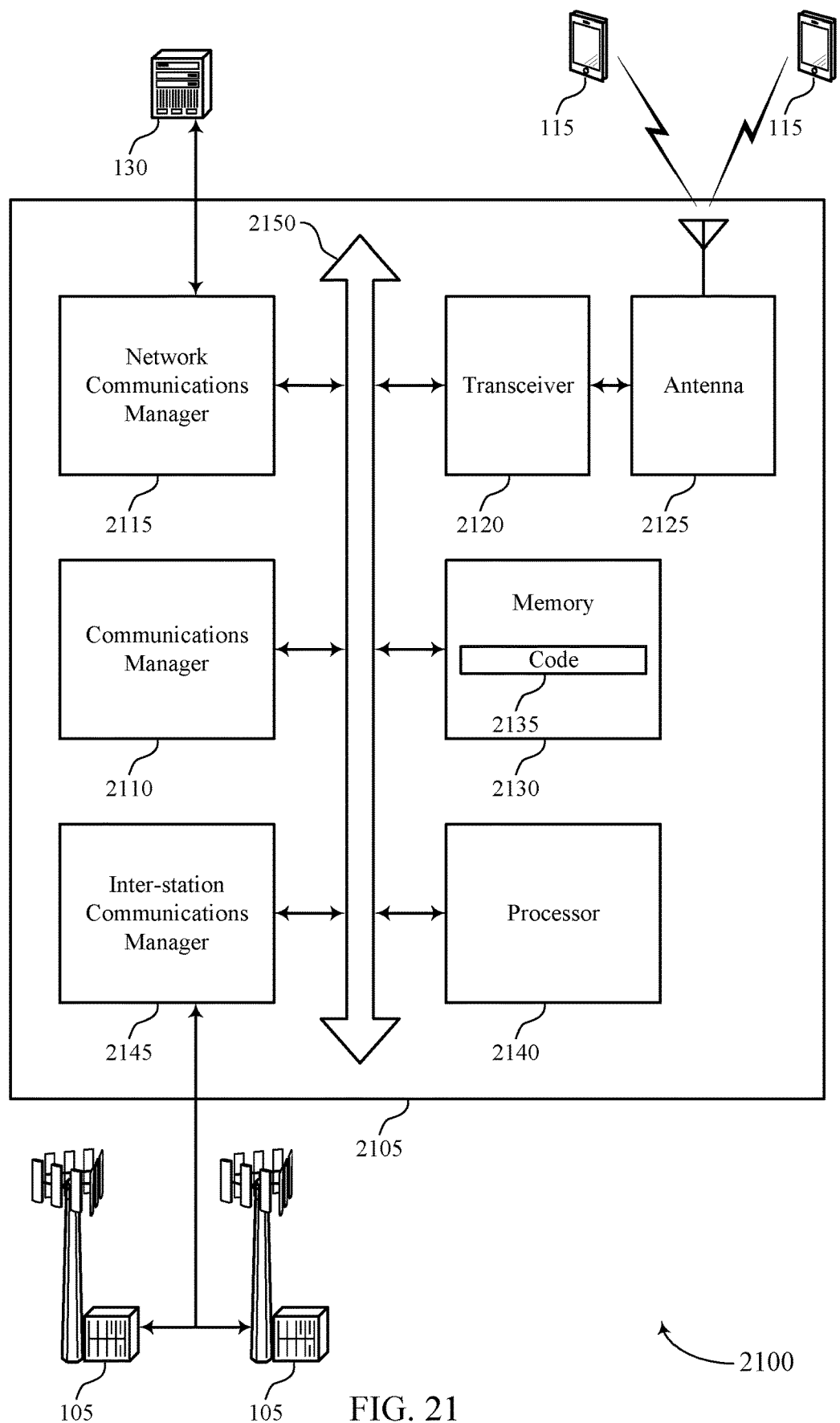
FIG. 21 shows a diagram of a system including a device that supports PUR techniques in wireless communications in accordance with aspects of the present disclosure.

FIG. 21 shows a diagram of a system 2100 including a device 2105 that supports PUR techniques in wireless communications in accordance with aspects of the present disclosure. The device 2105 may be an example of or include the components of device 1805, device 1905, or a base station 105 as described herein. The device 2105 may include components for bi-directional voice and data communications including components for transmitting and receiving communications, including a communications manager 2110, a network communications manager 2115, a transceiver 2120, an antenna 2125, memory 2130, a processor 2140, and an inter-station communications manager 2145. These components may be in electronic communication via one or more buses (e.g., bus 2150).

The communications manager 2110 may identify a set of PUR for uplink transmissions from a UE to the base station, transmit an indication of the set of PUR to one or more UEs, receive a PUR request message from a first UE, where the PUR request message indicates whether layer one HARQ acknowledgment of PUR transmissions is requested, determine, responsive to the PUR request message, a PUR configuration for the first UE that identifies a PUR allocation for the first UE, and transmit the PUR configuration to the first UE.

The network communications manager 2115 may manage communications with the core network (e.g., via one or more wired backhaul links). For example, the network communications manager 2115 may manage the transfer of data communications for client devices, such as one or more UEs 115.

The transceiver 2120 may communicate bi-directionally, via one or more antennas, wired, or wireless links as described above. For example, the transceiver 2120 may represent a wireless transceiver and may communicate bi-directionally with another wireless transceiver. The transceiver 2120 may also include a modem to modulate the packets and provide the modulated packets to the antennas for transmission, and to demodulate packets received from the antennas.

In some cases, the wireless device may include a single antenna 2125. However, in some cases the device may have more than one antenna 2125, which may be capable of concurrently transmitting or receiving multiple wireless transmissions.

The memory 2130 may include RAM, ROM, or a combination thereof. The memory 2130 may store computer-readable code 2135 including instructions that, when executed by a processor (e.g., the processor 2140) cause the device to perform various functions described herein. In some cases, the memory 2130 may contain, among other things, a BIOS which may control basic hardware or software operation such as the interaction with peripheral components or devices.

The processor 2140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In some cases, a memory controller may be integrated into processor 2140. The processor 2140 may be configured to execute computer-readable instructions stored in a memory (e.g., the memory 2130) to cause the device 2105 to perform various functions (e.g., functions or tasks supporting PUR techniques in wireless communications).

The inter-station communications manager 2145 may manage communications with other base station 105, and may include a controller or scheduler for controlling communications with UEs 115 in cooperation with other base stations 105. For example, the inter-station communications manager 2145 may coordinate scheduling for transmissions to UEs 115 for various interference mitigation techniques such as beamforming or joint transmission. In some examples, the inter-station communications manager 2145 may provide an X2 interface within an LTE/LTE-A wireless communication network technology to provide communication between base stations 105.

The code 2135 may include instructions to implement aspects of the present disclosure, including instructions to support wireless communications. The code 2135 may be stored in a non-transitory computer-readable medium such as system memory or other type of memory. In some cases, the code 2135 may not be directly executable by the processor 2140 but may cause a computer (e.g., when compiled and executed) to perform functions described herein.

Figure 22:
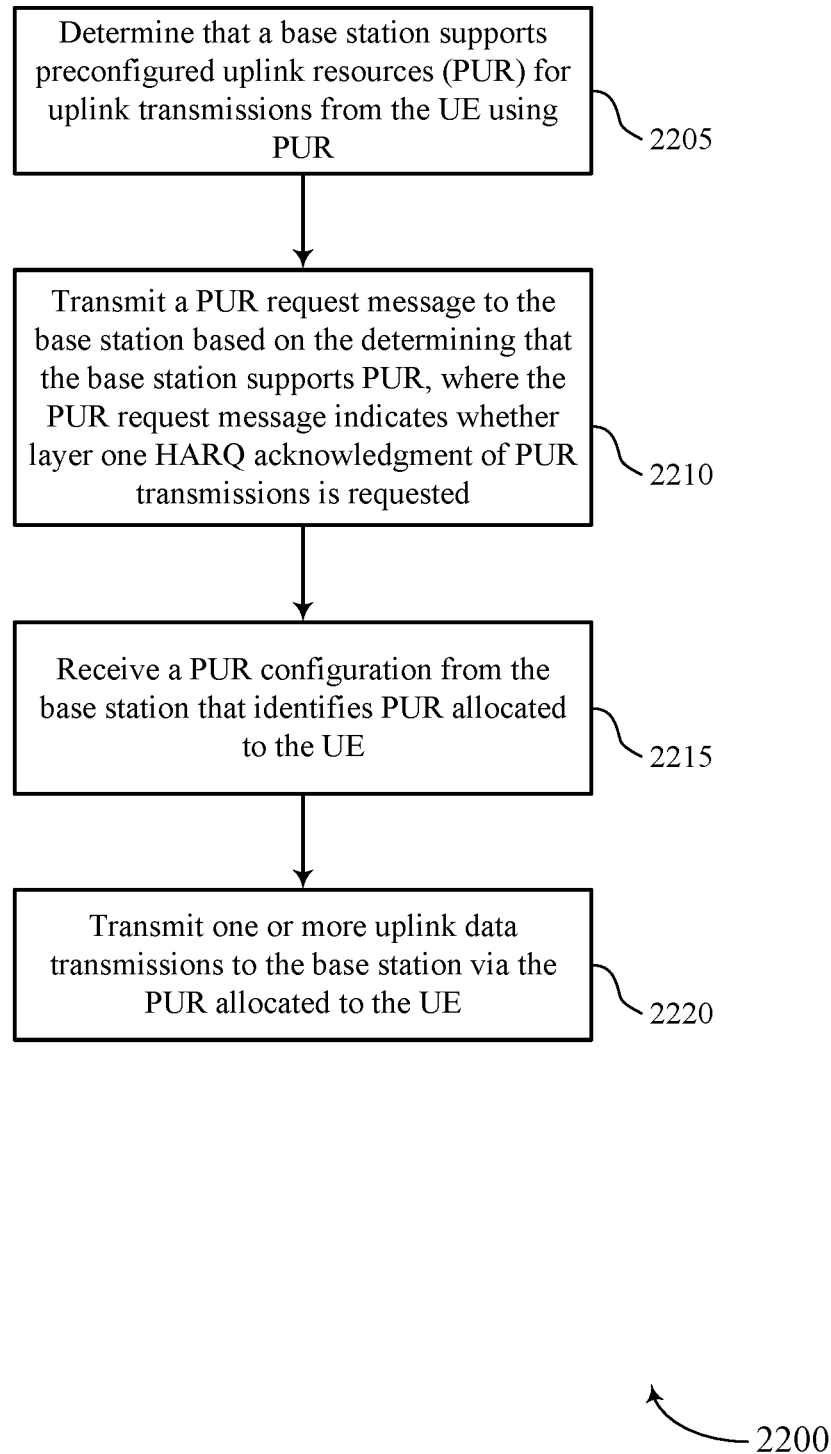
FIGS. 22 through 26 show flowcharts illustrating methods that support PUR techniques in wireless communications in accordance with aspects of the present disclosure.

FIG. 22 shows a flowchart illustrating a method 2200 that supports PUR techniques in wireless communications in accordance with aspects of the present disclosure. The operations of method 2200 may be implemented by a UE 115 or its components as described herein. For example, the operations of method 2200 may be performed by a communications manager as described with reference to FIGS. 14 through 17. In some examples, a UE may execute a set of instructions to control the functional elements of the UE to perform the functions described below. Additionally or alternatively, a UE may perform aspects of the functions described below using special-purpose hardware.

At 2205, the UE may determine that a base station supports PUR for uplink transmissions from the UE using PUR. The operations of 2205 may be performed according to the methods described herein. In some examples, aspects of the operations of 2205 may be performed by a PUR identification component as described with reference to FIGS. 14 through 17.

At 2210, the UE may transmit a PUR request message to the base station based on the determining that the base station supports PUR, where the PUR request message indicates whether layer one HARQ acknowledgment of PUR transmissions is requested. The operations of 2210 may be performed according to the methods described herein. In some examples, aspects of the operations of 2210 may be performed by a PUR request manager as described with reference to FIGS. 14 through 17.

At 2215, the UE may receive a PUR configuration from the base station that identifies PUR allocated to the UE. The operations of 2215 may be performed according to the methods described herein. In some examples, aspects of the operations of 2215 may be performed by a PUR configuration manager as described with reference to FIGS. 14 through 17.

At 2220, the UE may transmit one or more uplink data transmissions to the base station using the PUR allocated to the UE. The operations of 2220 may be performed according to the methods described herein. In some examples, aspects of the operations of 2220 may be performed by a PUR transmission manager as described with reference to FIGS. 14 through 17.

Figure 23:
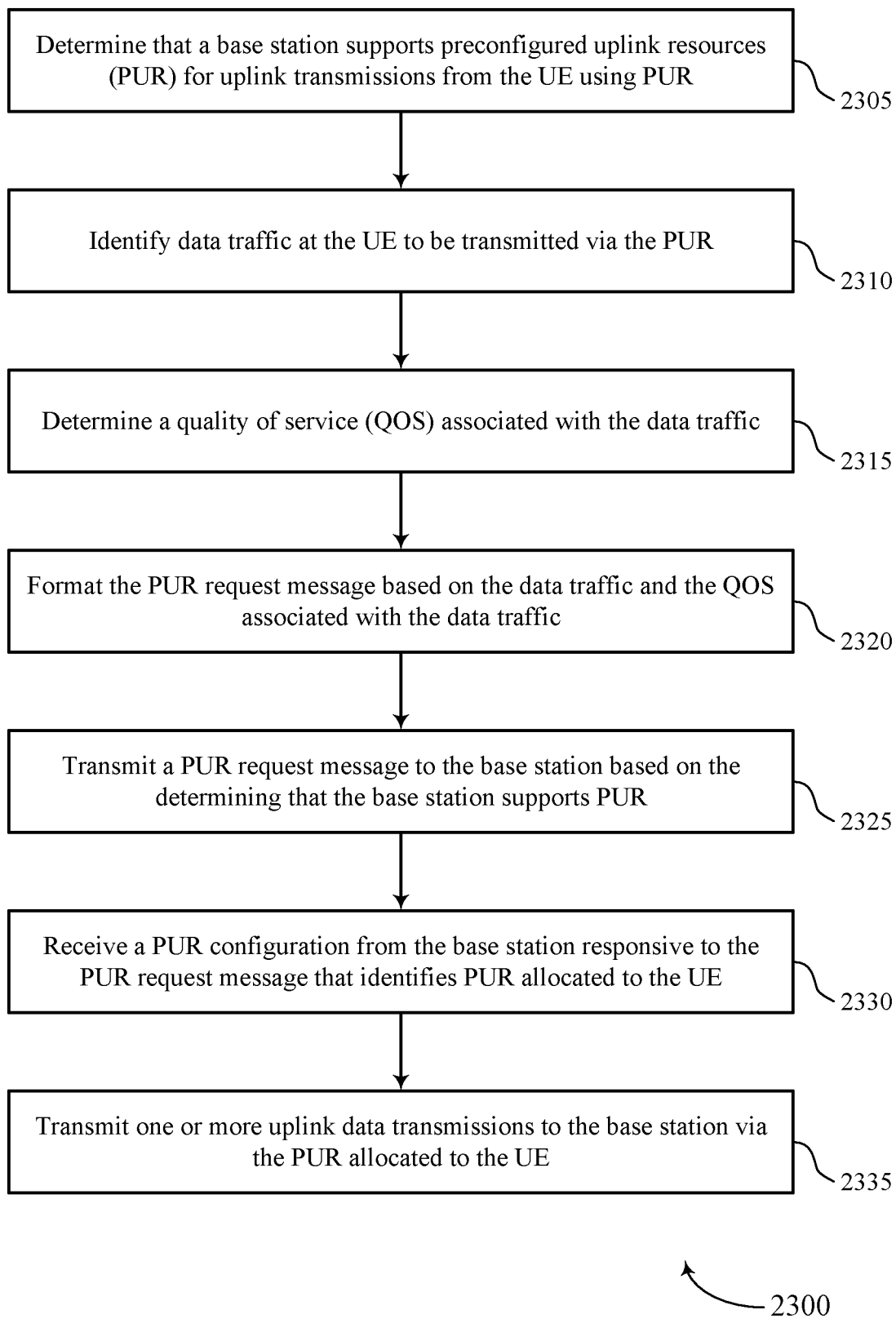

FIG. 23 shows a flowchart illustrating a method 2300 that supports PUR techniques in wireless communications in accordance with aspects of the present disclosure. The operations of method 2300 may be implemented by a UE 115 or its components as described herein. For example, the operations of method 2300 may be performed by a communications manager as described with reference to FIGS. 14 through 17. In some examples, a UE may execute a set of instructions to control the functional elements of the UE to perform the functions described below. Additionally or alternatively, a UE may perform aspects of the functions described below using special-purpose hardware.

At 2305, the UE may determine that a base station supports PUR for uplink transmissions from the UE using PUR. The operations of 2305 may be performed according to the methods described herein. In some examples, aspects of the operations of 2305 may be performed by a PUR identification component as described with reference to FIGS. 14 through 17.

At 2310, the UE may identify data traffic at the UE to be transmitted using the PUR. The operations of 2310 may be performed according to the methods described herein. In some examples, aspects of the operations of 2310 may be performed by a PUR request manager as described with reference to FIGS. 14 through 17.

At 2315, the UE may determine a QOS associated with the data traffic. The operations of 2315 may be performed according to the methods described herein. In some examples, aspects of the operations of 2315 may be performed by a PUR request manager as described with reference to FIGS. 14 through 17.

At 2320, the UE may format the PUR request message based on the data traffic and the QOS associated with the data traffic. The operations of 2320 may be performed according to the methods described herein. In some examples, aspects of the operations of 2320 may be performed by a PUR request manager as described with reference to FIGS. 14 through 17.

At 2325, the UE may transmit a PUR request message to the base station based on the determining that the base station supports PUR. The operations of 2325 may be performed according to the methods described herein. In some examples, aspects of the operations of 2325 may be performed by a PUR request manager as described with reference to FIGS. 14 through 17.

At 2330, the UE may receive a PUR configuration from the base station responsive to the PUR request message that identifies PUR allocated to the UE. The operations of 2330 may be performed according to the methods described herein. In some examples, aspects of the operations of 2330 may be performed by a PUR configuration manager as described with reference to FIGS. 14 through 17.

At 2335, the UE may transmit one or more uplink data transmissions to the base station using the PUR allocated to the UE. The operations of 2335 may be performed according to the methods described herein. In some examples, aspects of the operations of 2335 may be performed by a PUR transmission manager as described with reference to FIGS. 14 through 17.

Figure 24:
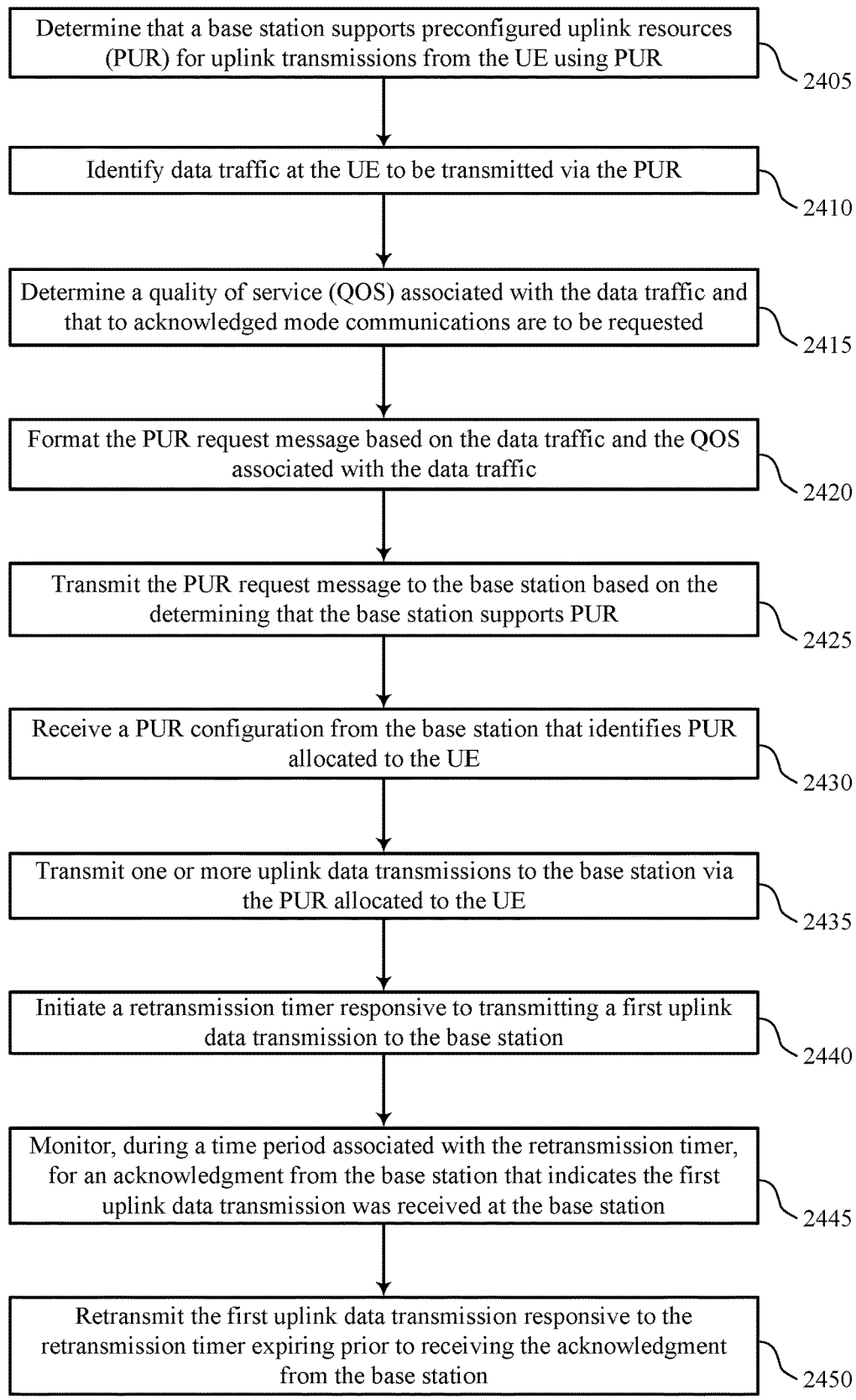

FIG. 24 shows a flowchart illustrating a method 2400 that supports PUR techniques in wireless communications in accordance with aspects of the present disclosure. The operations of method 2400 may be implemented by a UE 115 or its components as described herein. For example, the operations of method 2400 may be performed by a communications manager as described with reference to FIGS. 14 through 17. In some examples, a UE may execute a set of instructions to control the functional elements of the UE to perform the functions described below. Additionally or alternatively, a UE may perform aspects of the functions described below using special-purpose hardware.

At 2405, the UE may determine that a base station supports PUR for uplink transmissions from the UE using PUR. The operations of 2405 may be performed according to the methods described herein. In some examples, aspects of the operations of 2405 may be performed by a PUR identification component as described with reference to FIGS. 14 through 17.

At 2410, the UE may identify data traffic at the UE to be transmitted using the PUR. The operations of 2410 may be performed according to the methods described herein. In some examples, aspects of the operations of 2410 may be performed by a PUR request manager as described with reference to FIGS. 14 through 17.

At 2415, the UE may determine a QOS associated with the data traffic and that to acknowledged mode communications are to be requested. The operations of 2415 may be performed according to the methods described herein. In some examples, aspects of the operations of 2415 may be performed by a PUR request manager as described with reference to FIGS. 14 through 17.

At 2420, the UE may format the PUR request message based on the data traffic and the QOS associated with the data traffic. The operations of 2420 may be performed according to the methods described herein. In some examples, aspects of the operations of 2420 may be performed by a PUR request manager as described with reference to FIGS. 14 through 17.

At 2425, the UE may transmit the PUR request message to the base station based on the determining that the base station supports PUR. The operations of 2425 may be performed according to the methods described herein. In some examples, aspects of the operations of 2425 may be performed by a PUR request manager as described with reference to FIGS. 14 through 17.

At 2430, the UE may receive a PUR configuration from the base station that identifies PUR allocated to the UE. The operations of 2430 may be performed according to the methods described herein. In some examples, aspects of the operations of 2430 may be performed by a PUR configuration manager as described with reference to FIGS. 14 through 17.

At 2435, the UE may transmit one or more uplink data transmissions to the base station using the PUR allocated to the UE. The operations of 2435 may be performed according to the methods described herein. In some examples, aspects of the operations of 2435 may be performed by a PUR transmission manager as described with reference to FIGS. 14 through 17.

At 2440, the UE may initiate a retransmission timer responsive to transmitting a first uplink data transmission to the base station. The operations of 2440 may be performed according to the methods described herein. In some examples, aspects of the operations of 2440 may be performed by a retransmission timer as described with reference to FIGS. 14 through 17.

At 2445, the UE may monitor, during a time period associated with the retransmission timer, for an acknowledgment from the base station that indicates the first uplink data transmission was received at the base station. The operations of 2445 may be performed according to the methods described herein. In some examples, aspects of the operations of 2445 may be performed by an acknowledgment manager as described with reference to FIGS. 14 through 17.

At 2450, the UE may retransmit the first uplink data transmission responsive to the retransmission timer expiring prior to receiving the acknowledgment from the base station. The operations of 2450 may be performed according to the methods described herein. In some examples, aspects of the operations of 2450 may be performed by an acknowledgment manager as described with reference to FIGS. 14 through 17.

Figure 25:
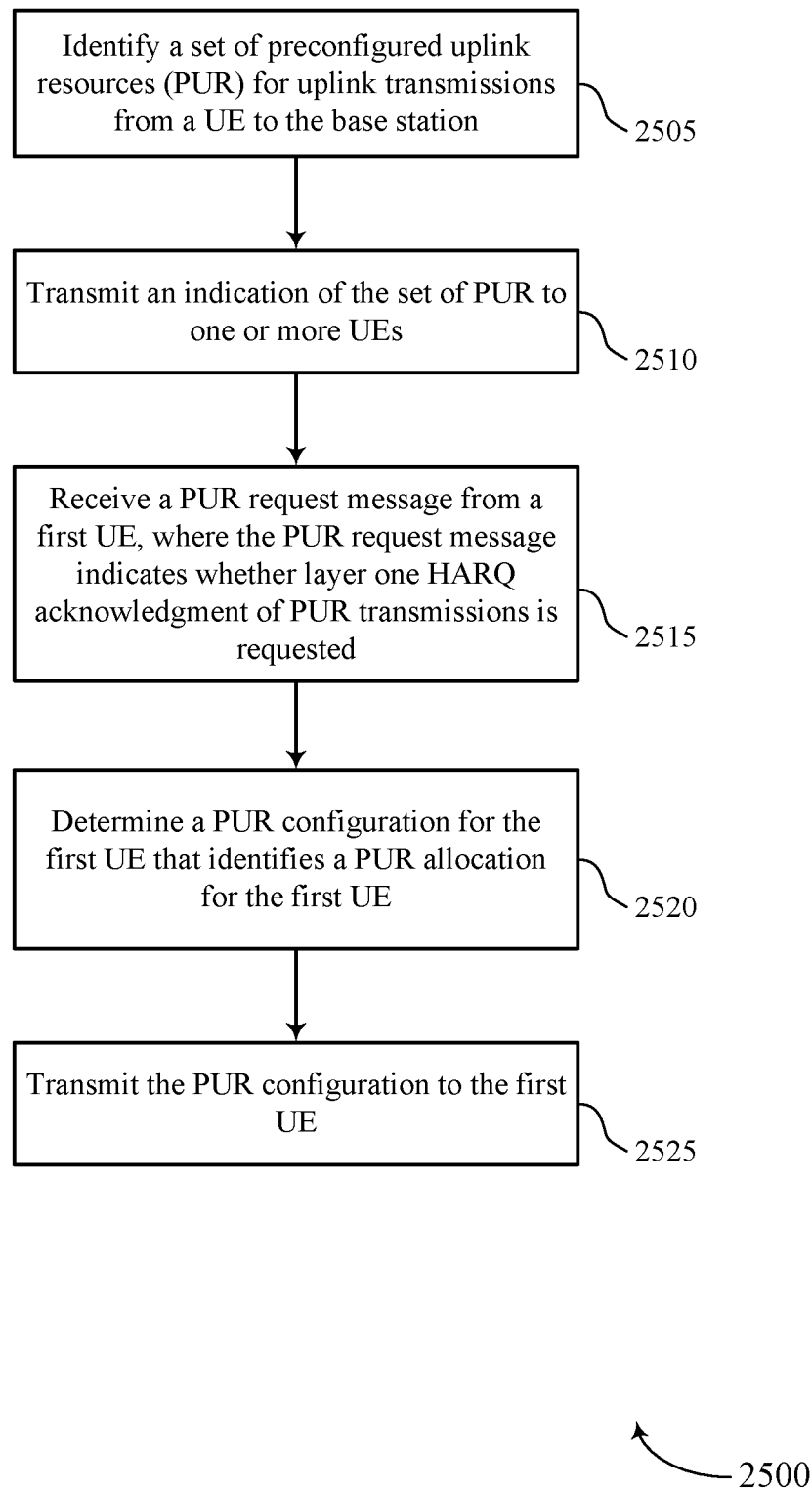

FIG. 25 shows a flowchart illustrating a method 2500 that supports PUR techniques in wireless communications in accordance with aspects of the present disclosure. The operations of method 2500 may be implemented by a base station 105 or its components as described herein. For example, the operations of method 2500 may be performed by a communications manager as described with reference to FIGS. 18 through 21. In some examples, a base station may execute a set of instructions to control the functional elements of the base station to perform the functions described below. Additionally or alternatively, a base station may perform aspects of the functions described below using special-purpose hardware.

At 2505, the base station may identify a set of PUR for uplink transmissions from a UE to the base station. The operations of 2505 may be performed according to the methods described herein. In some examples, aspects of the operations of 2505 may be performed by a PUR identification component as described with reference to FIGS. 18 through 21.

At 2510, the base station may transmit an indication of the set of PUR to one or more UEs. The operations of 2510 may be performed according to the methods described herein. In some examples, aspects of the operations of 2510 may be performed by a PUR identification component as described with reference to FIGS. 18 through 21.

At 2515, the base station may receive a PUR request message from a first UE, where the PUR request message indicates whether layer one HARQ acknowledgment of PUR transmissions is requested. The operations of 2515 may be performed according to the methods described herein. In some examples, aspects of the operations of 2515 may be performed by a PUR request manager as described with reference to FIGS. 18 through 21.

At 2520, the base station may determine a PUR configuration for the first UE that identifies a PUR allocation for the first UE. The operations of 2520 may be performed according to the methods described herein. In some examples, aspects of the operations of 2520 may be performed by a PUR configuration manager as described with reference to FIGS. 18 through 21.

At 2525, the base station may transmit the PUR configuration to the first UE. The operations of 2525 may be performed according to the methods described herein. In some examples, aspects of the operations of 2525 may be performed by a PUR transmission manager as described with reference to FIGS. 18 through 21.

Figure 26:
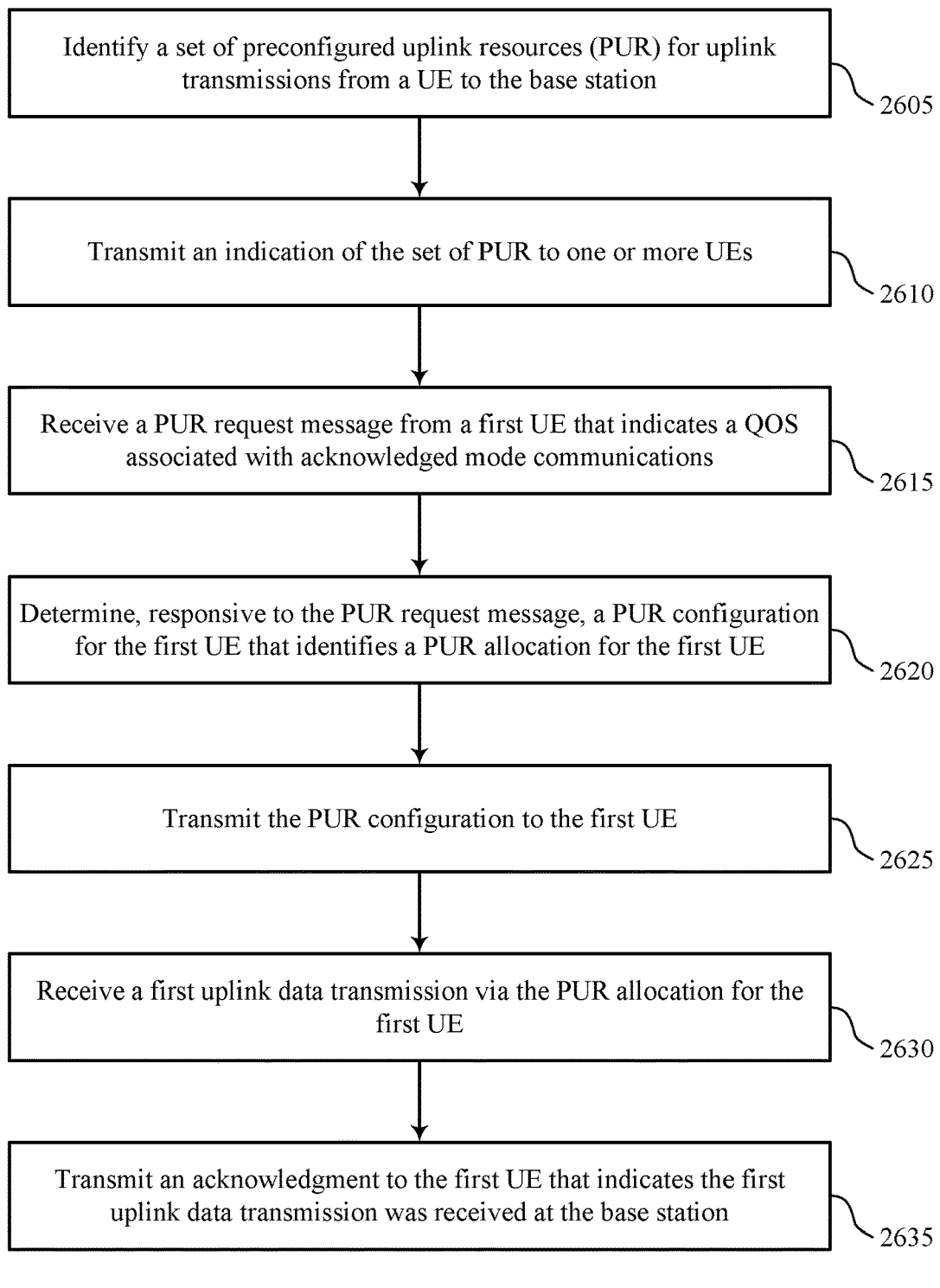

FIG. 26 shows a flowchart illustrating a method 2600 that supports PUR techniques in wireless communications in accordance with aspects of the present disclosure. The operations of method 2600 may be implemented by a base station 105 or its components as described herein. For example, the operations of method 2600 may be performed by a communications manager as described with reference to FIGS. 18 through 21. In some examples, a base station may execute a set of instructions to control the functional elements of the base station to perform the functions described below. Additionally or alternatively, a base station may perform aspects of the functions described below using special-purpose hardware.

At 2605, the base station may identify a set of PUR for uplink transmissions from a UE to the base station. The operations of 2605 may be performed according to the methods described herein. In some examples, aspects of the operations of 2605 may be performed by a PUR identification component as described with reference to FIGS. 18 through 21.

At 2610, the base station may transmit an indication of the set of PUR to one or more UEs. The operations of 2610 may be performed according to the methods described herein. In some examples, aspects of the operations of 2610 may be performed by a PUR identification component as described with reference to FIGS. 18 through 21.

At 2615, the base station may receive a PUR request message from a first UE that indicates a QOS associated with acknowledged mode communications. The operations of 2615 may be performed according to the methods described herein. In some examples, aspects of the operations of 2615 may be performed by a PUR request manager as described with reference to FIGS. 18 through 21.

At 2620, the base station may determine, responsive to the PUR request message, a PUR configuration for the first UE that identifies a PUR allocation for the first UE. The operations of 2620 may be performed according to the methods described herein. In some examples, aspects of the operations of 2620 may be performed by a PUR configuration manager as described with reference to FIGS. 18 through 21.

At 2625, the base station may transmit the PUR configuration to the first UE. The operations of 2625 may be performed according to the methods described herein. In some examples, aspects of the operations of 2625 may be performed by a PUR transmission manager as described with reference to FIGS. 18 through 21.

At 2630, the base station may receive a first uplink data transmission using the PUR allocation for the first UE. The operations of 2630 may be performed according to the methods described herein. In some examples, aspects of the operations of 2630 may be performed by a PUR reception manager as described with reference to FIGS. 18 through 21.

At 2635, the base station may transmit an acknowledgment to the first UE that indicates the first uplink data transmission was received at the base station. The operations of 2635 may be performed according to the methods described herein. In some examples, aspects of the operations of 2635 may be performed by an acknowledgment manager as described with reference to FIGS. 18 through 21.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a system information block from a network entity;
   determining, based at least in part on the system information block, that the network entity supports preconfigured uplink resources (PUR) for uplink transmissions from the UE using PUR without performing a random access procedure;
   transmitting a PUR request message to the network entity based at least in part on the determining that the network entity supports PUR, wherein the PUR request message requests a new configuration of resources for one or more subsequent uplink transmissions using PUR and indicates whether a radio resource control message for acknowledgment of reception at the network entity of the one or more subsequent uplink transmissions using PUR is requested;
   receiving a PUR configuration from the network entity that identifies PUR allocated to the UE for the uplink transmissions using PUR, wherein the PUR configuration is based at least in part on the PUR request message requesting the new configuration of resources; and
   transmitting the uplink transmissions to the network entity using the PUR allocated to the UE.

2. The method of claim 1, further comprising:
   formatting the PUR request message to request acknowledgment of PUR transmissions via the radio resource control message or via a layer two or layer three acknowledgment.

3. The method of claim 2, wherein the layer two or layer three acknowledgment from the network entity is provided via one or more of a medium access control (MAC) control element (MAC-CE), a radio link control (RLC) status report, a packet data convergence protocol (PDCP) status report, a radio resource control (RRC) message, or any combinations thereof.

4. The method of claim 1, further comprising:
   initiating a retransmission timer responsive to transmitting a first uplink transmission using PUR to the network entity; and
   monitoring, during a time period associated with the retransmission timer, for an acknowledgment from the network entity that indicates the first uplink transmission was received at the network entity.

5. The method of claim 4, further comprising:
   retransmitting the first uplink transmission using PUR responsive to the retransmission timer expiring prior to receiving the acknowledgment from the network entity.

6. The method of claim 4, further comprising:
   receiving the acknowledgment from the network entity; and
   discontinuing the retransmission timer.

7. The method of claim 1, wherein the system information block (SIB) indicates PUR support by the network entity.

8. The method of claim 7, wherein the SIB indicates one or more of acknowledged mode (AM) PUR support that provides acknowledgments of PUR transmissions via layer two or layer three acknowledgments, unacknowledged mode (UM) PUR support that provides acknowledgments of the PUR transmissions via layer one Hybrid Automatic Repeat Request (HARQ) acknowledgments, or combinations thereof.

9. The method of claim 8, wherein the PUR configuration provides an explicit indication of an AM PUR allocation or a UM PUR allocation to the UE, or an implicit indication of the AM PUR allocation or the UM PUR allocation to the UE, and wherein the implicit indication is based at least in part on one or more of a requested mode in the PUR request message, a default mode of operation, an indicated capability of the network entity, or any combinations thereof.

10. The method of claim 1, wherein the PUR request message includes a requested type of acknowledgments of PUR transmissions that indicates whether the UE requests that acknowledgments of the PUR transmissions be provided via layer two or layer three signaling, or that the UE requests that acknowledgments of the PUR transmissions be provided via layer one Hybrid Automatic Repeat Request (HARQ} acknowledgments, wherein the requested type of acknowledgments of the PUR transmissions is an explicit request or an implicit request, and wherein the implicit request is based at least in part on a default mode of operation or an indicated capability of the network entity.

11. The method of claim 1, wherein the UE is configured for user-plane (UP) cellular Internet of things (CIoT) evolved packet system (EPS) optimization, control-plane (CP) CIoT EPS optimization, CP CIoT 5GS optimization, or UP CIoT 5GS optimization, and the PUR request message indicates that layer two or layer three acknowledgment of PUR transmissions is requested.

12. The method of claim 1, further comprising:
    identifying data traffic at the UE to be transmitted using the PUR;
    determining a quality of service (QOS) associated with the data traffic; and
    formatting the PUR request message based at least in part on the data traffic and the QOS associated with the data traffic.

13. The method of claim 1, wherein the transmitting the PUR request message to the network entity is performed via uplink resources provided to the UE in one or more of an uplink grant, a semi-persistent scheduling (SPS) uplink grant, an early data transmission (EDT) of a random access procedure, a different PUR resource, or any combinations thereof.

14. The method of claim 1, wherein the UE is in an idle mode prior to transmitting the uplink transmissions using the PUR and returns to the idle mode upon completion of the uplink transmissions.

15. The method of claim 1, wherein the uplink transmissions from the UE are transmitted using a radio resource control (RRC) PUR message.

16. A method for wireless communication at a network entity, comprising:
    identifying a set of preconfigured uplink resources (PUR) for uplink transmissions from a user equipment (UE) to the network entity without performing a random access procedure;
    transmitting an indication of the set of PUR to one or more UEs in a system information block;
    receiving a PUR request message from a first UE, wherein the PUR request message requests a new configuration of resources for one or more subsequent uplink transmissions using PUR and indicates whether a radio resource control message for acknowledgment of reception at the network entity of the one or more subsequent uplink transmissions using PUR is requested;
    determining a PUR configuration for the first UE that identifies a PUR allocation for the first UE for the uplink transmissions using, wherein the PUR configuration is based at least in part on the PUR request message requesting the new configuration of resources; and
    transmitting the PUR configuration to the first UE.

17. The method of claim 16, wherein the determining the PUR configuration further comprises:
    determining whether the PUR request message is formatted to request acknowledgment of PUR transmissions via radio resource control (RRC) acknowledgments.

18. The method of claim 17, further comprising:
    receiving a first uplink transmission using the PUR allocation for the first UE; and
    transmitting, based at least in part on the determining the PUR configuration, one or more of a layer one HARQ acknowledgment or an RRC acknowledgment to the first UE that indicates the first uplink transmission was received at the network entity.

19. The method of claim 16, wherein the system information block indicates one or more of acknowledged mode (AM) PUR support that provides acknowledgments of PUR transmissions via layer two or layer three acknowledgments, unacknowledged mode (UM) PUR support that provides acknowledgments of PUR transmissions via layer one Hybrid Automatic Repeat Request (HARQ) acknowledgments, or combinations thereof.

20. The method of claim 16, wherein the PUR request message is received from the first UE via uplink resources provided to the first UE in one or more of an uplink grant, a semi-persistent scheduling (SPS) uplink grant, an early data transmission (EDT) of a random access procedure, a different PUR resource, or any combinations thereof.

21. The method of claim 16, wherein the first UE is configured for user-plane (UP) cellular Internet of things (CIoT) evolved packet system (EPS) optimization, control-plane (CP) CIoT EPS optimization, CP CIoT 5GS optimization, or UP CIoT 5GS optimization, and the PUR request message indicates that layer two or layer three acknowledgment of PUR transmissions is requested.

22. An apparatus for wireless communication at a user equipment (UE), comprising:
    a processor,
    memory in electronic communication with the processor; and
    instructions stored in the memory and executable by the processor to cause the apparatus to:
      receive a system information block from a network entity;
      determine, based at least in part on the system information block, that the network entity supports preconfigured uplink resources (PUR) for uplink transmissions from the UE using PUR without performing a random access procedure;
      transmit a PUR request message to the network entity based at least in part on the determining that the network entity supports PUR, wherein the PUR request message requests a new configuration of resources for one or more subsequent uplink transmissions using PUR and indicates whether a radio resource control message for acknowledgment of reception at the network entity of the one or more subsequent uplink transmissions using PUR is requested;
      receive a PUR configuration from the network entity that identifies PUR allocated to the UE for the uplink transmissions using PUR, wherein the PUR configuration is based at least in part on the PUR request message that requests the new configuration of resources; and
      transmit the uplink transmissions to the network entity using the PUR allocated to the UE.

23. The apparatus of claim 22, wherein the instructions are further executable by the processor to cause the apparatus to:
    format the PUR request message to request acknowledgment of PUR transmissions via the radio resource control message or via a layer two or layer three acknowledgment.

24. The apparatus of claim 22, wherein the instructions are further executable by the processor to cause the apparatus to:
    initiate a retransmission timer responsive to transmitting a first uplink transmission to the network entity; and
    monitor, during a time period associated with the retransmission timer, for an acknowledgment from the network entity that indicates the first uplink transmission was received at the network entity.

25. The apparatus of claim 24, wherein the instructions are further executable by the processor to cause the apparatus to:
retransmit the first uplink transmission responsive to the retransmission timer expiring prior to receiving the acknowledgment from the network entity; or discontinue the retransmission timer and transition to an idle mode responsive to receiving the acknowledgment from the network entity prior to the retransmission timer expiring.

26. An apparatus for wireless communication at a network entity, comprising:
a processor;
memory in electronic communication with the processor; and
instructions stored in the memory and executable by the processor to cause the apparatus to:
identify a set of preconfigured uplink resources (PUR) for uplink transmissions from a user equipment (UE) to the network entity without performing a random access procedure;
transmit an indication of the set of PUR to one or more UEs in a system information block;
receive a PUR request message from a first UE, wherein the PUR request message requests a new configuration of resources for one or more subsequent uplink transmissions using PUR and indicates whether a radio resource control message for acknowledgment of reception at the network entity of the one or more subsequent uplink transmissions using PUR is requested;
determine a PUR configuration for the first UE that identifies a PUR allocation for the first UE for the uplink transmissions using PUR, wherein the PUR configuration is based at least in part on the PUR request message that requests the new configuration of resources; and
transmit the PUR configuration to the first UE.

27. The apparatus of claim 26, wherein the instructions are further executable by the processor to cause the apparatus to:
determine whether the PUR request message is formatted to request acknowledgment of PUR transmissions via radio resource control (RRC) acknowledgments.

28. The apparatus of claim 26, wherein the instructions are further executable by the processor to cause the apparatus to:
receive a first uplink transmission using the PUR allocation for the first UE; and
transmit, based at least in part on the determined PUR configuration, one or more of a layer one HARQ acknowledgment or an RRC acknowledgment to the first UE that indicates the first uplink transmission was received at the network entity.

29. The method of claim 16, further comprising:
indicating, in the system information block, that the network entity supports PUR for uplink transmissions from the UE without performing a random access procedure.

30. The apparatus of claim 22, wherein the system information block (SIB) indicates PUR support by the network entity.

* * * * *